United States Patent
Aibara et al.

(10) Patent No.: US 9,641,779 B2
(45) Date of Patent: May 2, 2017

(54) SOLID-STATE IMAGE SENSING DEVICE WITH INCREASED DYNAMIC RANGE

(71) Applicant: Renesas Electronics Corporation, Kawasaki-shi, Kanagawa (JP)

(72) Inventors: Yasutoshi Aibara, Kanagawa (JP); Fumihide Murao, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 14/517,807

(22) Filed: Oct. 18, 2014

(65) Prior Publication Data
US 2015/0109506 A1    Apr. 23, 2015

(30) Foreign Application Priority Data
Oct. 18, 2013  (JP) .................................. 2013-217172

(51) Int. Cl.
*H04N 5/3745* (2011.01)
*H04N 5/351* (2011.01)
*H04N 5/378* (2011.01)

(52) U.S. Cl.
CPC ......... *H04N 5/37455* (2013.01); *H04N 5/351* (2013.01); *H04N 5/378* (2013.01)

(58) Field of Classification Search
CPC ..... H04N 5/37455; H04N 5/378; H04N 5/351
See application file for complete search history.

(56) References Cited

U.S. PATENT DOCUMENTS

| 2003/0071666 A1* | 4/2003 | Bailey | H03K 4/026 327/131 |
| 2007/0046513 A1* | 3/2007 | Ham | H03M 1/58 341/118 |
| 2008/0218619 A1* | 9/2008 | Egawa | H04N 5/243 348/296 |
| 2008/0239106 A1* | 10/2008 | Sano | H03M 1/0695 348/241 |
| 2011/0025895 A1* | 2/2011 | Hasegawa | H03M 1/14 348/294 |
| 2011/0037868 A1* | 2/2011 | Ota | H04N 5/357 348/222.1 |

(Continued)

FOREIGN PATENT DOCUMENTS

JP    2003-60507 A    2/2003

OTHER PUBLICATIONS

Johns, David A., et al., "Analog Integrated Circuit Design", Wiley, pp. 492-505, 1997.

(Continued)

*Primary Examiner* — Abdelaaziz Tissire
(74) *Attorney, Agent, or Firm* — Shapiro, Gabor and Rosenberger, PLLC

(57) ABSTRACT

A CMOS image sensor used as a solid-state image sensing device includes a pixel circuit for outputting a voltage of a level corresponding to the illuminance, and an A/D converter for converting an output voltage of the pixel circuit into a digital signal. The resolution on the low illuminance side is higher than the resolution on the high illuminance side in the A/D converter. Thus, the dynamic range can be increased and the operation speed can be increased, compared to the case in which the resolution is constant independent of the illuminance.

8 Claims, 24 Drawing Sheets

(56) References Cited

U.S. PATENT DOCUMENTS

| | | | |
|---|---|---|---|
| 2011/0062310 A1* | 3/2011 | Kudo | H04N 5/2176 |
| | | | 250/208.1 |
| 2011/0248145 A1* | 10/2011 | Tanaka | H03M 1/144 |
| | | | 250/208.1 |

OTHER PUBLICATIONS

Aizawa, Kiyoharu, et al., Image Information Media Critical Technology series vol. 9, "CMOS Image Sensor", Corona Publishing Co., Ltd., pp. 180-187, 2012.

* cited by examiner

US 9,641,779 B2

SOLID-STATE IMAGE SENSING DEVICE WITH INCREASED DYNAMIC RANGE

CROSS-REFERENCE TO RELATED APPLICATIONS

The disclosure of Japanese Patent Application No. 2013-217172 filed on Oct. 18, 2013 including the specification, drawings and abstract is incorporated herein by reference in its entirety.

BACKGROUND

The present invention relates to a solid-state image sensing device, which is suitable for use, for example, in complementary metal-oxide semiconductor (CMOS) image sensors.

In order to use a COMS image sensor as an in-car camera, it is necessary to increase the dynamic range of the CMOS image sensor to increase the operation speed. The CMOS image sensor is provided with an A/D converter for converting an analog signal output from a pixel circuit into a digital signal. A single-slope integrating type A/D converter and a successive approximation type A/D converter are known example of the A/D converter. The single-slope integrating type A/D converter compares the voltage level between the voltage of an analog signal and the voltage of a ramp wave signal (see Patent Document 1: Japanese Unexamined Patent Publication No. 2003-60507). The successive approximation type A/D converter compares the voltage level between the voltage of an analog signal and each of a plurality of reference voltages successively (see Non-Patent Document 1: David A. Johns, Ken Martin "Analog integrated circuit design" Wiley p. 492-504).

Further, a high dynamic range (HDR) method (see Non-Patent Document 2: KiyoharuAizawa, Takayuki Hamamoto Image Information Media critical technology series vol. 9, "CMOS image sensor", CORONA PUBLISHING CO., LTD, p.180) is known as a method of increasing the dynamic range of the CMOS sensor.

SUMMARY

However, the existing CMOS image sensor has a problem that the dynamic range is small and the operation speed is slow.

These and other objects and advantages of the present invention will become more apparent from the following description taken in conjunction with the accompanying drawings.

According to an embodiment of the present invention, there is provided an A/D converter for converting the output voltage of a pixel circuit into a digital signal, in which the resolution on a high illuminance side is set to be lower than the resolution on a low illuminance side.

According to the embodiment described above, it is possible to increase the dynamic range to increase the operation speed.

DETAILED DESCRIPTION

First Comparative Example

Figure 1:
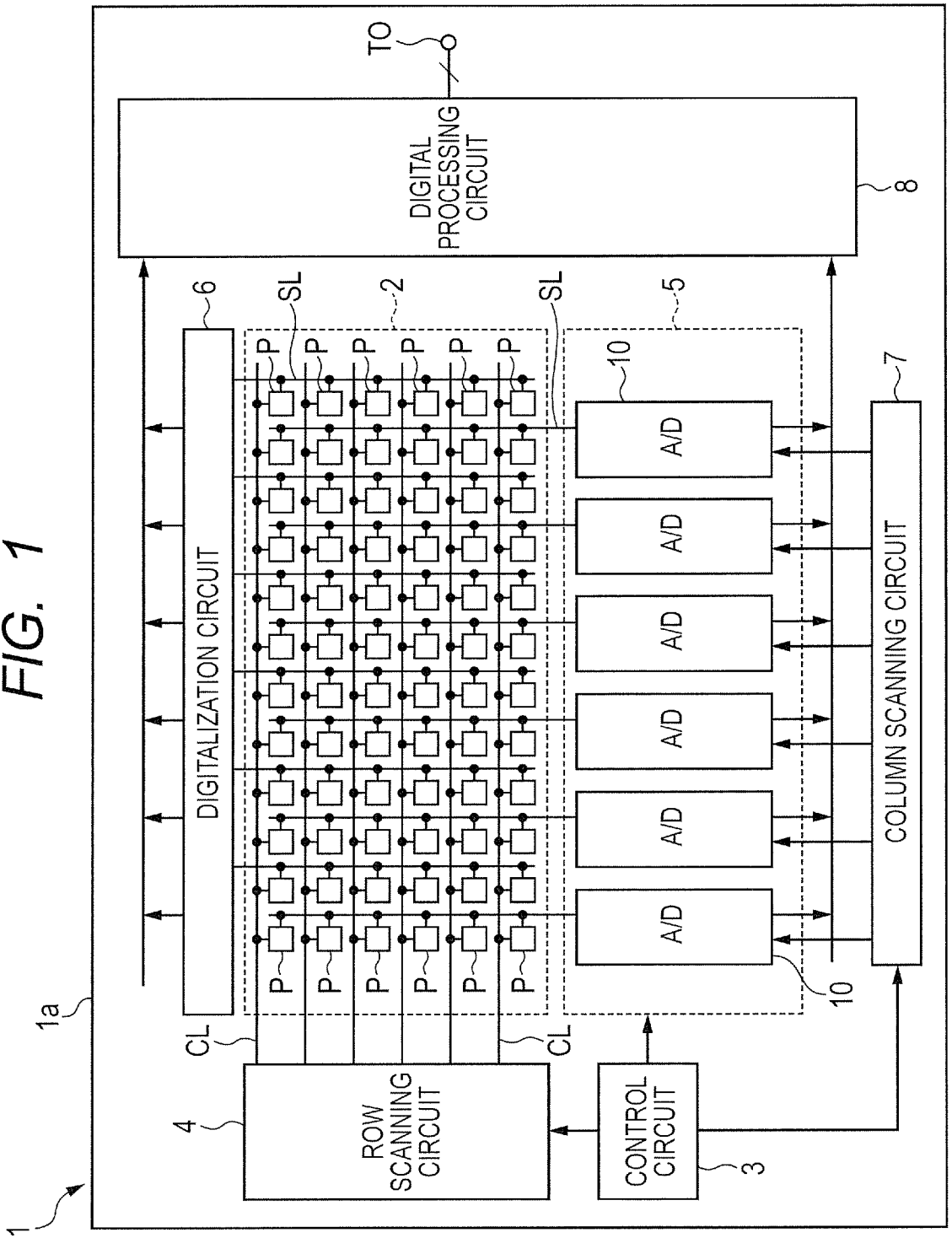
FIG. 1 is a block diagram of the configuration of a CMOS image sensor according to a first comparative example of the present invention.

FIG. 1 is a block diagram showing the configuration of a CMOS image sensor (solid-state image sensing device) which is a first comparative example. In FIG. 1, the CMOS image sensor 1 includes a pixel array 2 formed on a surface of a semiconductor substrate 1a, a control circuit 3, a row scanning circuit 4, digitization circuits 5 and 6, a column scanning circuit 7, a digital signal processing circuit 8, and an output terminal group TO.

The pixel array 2 includes: multiple pixel circuits P arranged in multiple rows and columns; multiple control signal line groups CL provided corresponding to each of the rows; and multiple signal lines SL provided corresponding to each of the columns. The pixel circuit P is controlled by a control signal group given through the corresponding control signal line group CL from the row scanning circuit 4. Then, the pixel circuit P sequentially outputs a dark signal (reset signal) with a reference voltage, as well as a bright signal (illuminance signal) with a voltage of a level corresponding to the illuminance, to the corresponding signal line SL.

Note that in the case of picking up a color image, each pixel circuit P is formed to be sensitive to red, green, or blue. Then, the pixel circuits P are arranged in the Bayer pattern. In the Bayer pattern, a row in which pixel circuits P for green and for red are alternately arranged as well as a row in which pixel circuits P for green and for blue are alternately arranged, are arranged in a mosaic pattern.

The control circuit 3 controls the entire CMOS image sensor 1 according to an external control signal. The row scanning circuit 4 is coupled to one side terminals of the multiple control signal line groups CL. The row scanning circuit 4 selects multiple rows sequentially one by one. Then, the row scanning circuit 4 gives a control signal group to each pixel circuit P of the selected row, to allow each pixel circuit P to output a dark signal and a bright signal, sequentially. The row scanning circuit 4 operates in synchronization with a clock signal and selects each row only for one cycle period.

The digitization circuit 5 is provided on one side (on the lower side in FIG. 1) of the pixel array 2, including multiple A/D converters 10 provided corresponding to columns with odd numbers of the multiple columns. Each A/D converter 10 converts each of the dark and bright signals given by the pixel circuit P of the corresponding column selected by the row scanning circuit 4, through the signal line SL of the corresponding column, into a digital signal.

The digitization circuit 6 is provided on the other side (on the upper side in FIG. 1) of the pixel array 2, including the AD converts 10 provided corresponding to columns with even numbers of the multiple columns. Each A/D converter 10 converts each of the dark and bright signals given by the pixel circuit P of the corresponding column selected by the row scanning circuit 4 through the signal line SL of the corresponding column, into a digital signal.

The column scanning circuit 7 selects multiple columns, sequentially one by one, in response to the completion of the A/D conversion of each of the dark and bright signals output from the pixel circuits P belonging to the row selected by the row scanning circuit 4. The A/D converter 10 of the selected column transmits the digital signal indicating the dark signal, as well as the digital signal indicating the bright signal to the digital signal processing circuit 8 through a data bus.

The digital signal processing circuit 8 once stores the digital signal indicating the dark signal as well as the digital signal indicating the bright signal. Then, the digital signal processing circuit 8 generates an image signal for one screen by applying predetermined processing to the stored digital signals. The digital signal processing circuit 8 outputs the image signal to the outside through the output terminal group TO.

Figure 2:
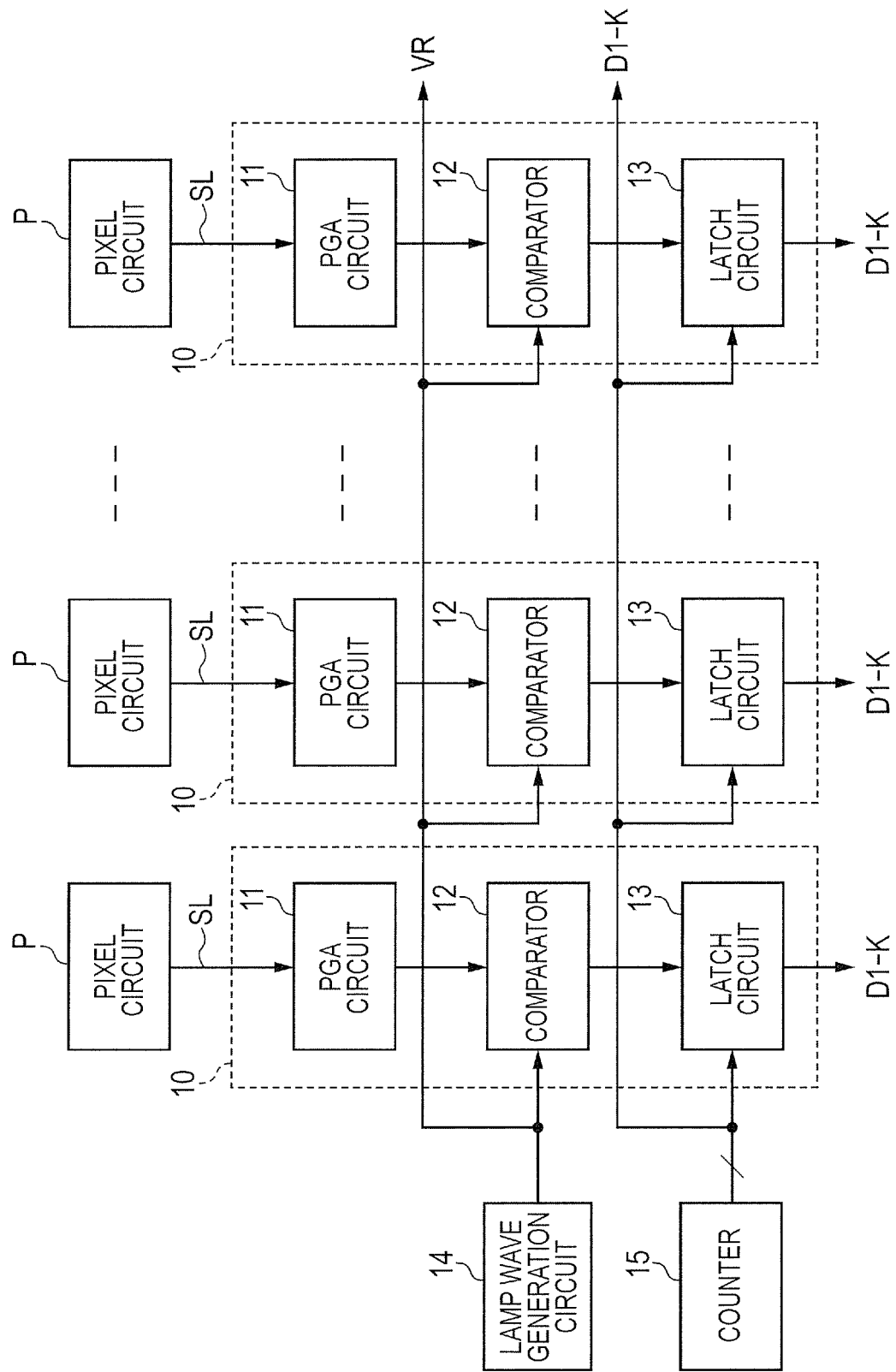
FIG. 2 is a circuit block diagram of the configuration of an A/D converter shown in FIG. 1.

FIG. 2 is a block diagram of the configuration of the A/D converters 10. In FIG. 2, the A/D converter 10 is a single-slope integrating type A/D converter, including a programmable grain amplifier (PGA) circuit 11, a comparator 12, and a latch circuit 13. Further, a ramp wave generation circuit 14 and a counter 15 are provided in common to all the A/D converters 10. The ramp wave generation circuit 14 and the counter 15 are provided, for example, within the control circuit 3.

The ramp wave generation circuit 14 generates a ramp wave signal VR in which the voltage decreases at a constant tilt angle, and gives the generated ramp wave signal VR to the comparator 12. The counter 15 generates count signals D1 to DK of K bits (where K is an integer of two or more), and gives the count signals D1 to DK to the latch circuit 13. The count value of the count signals D1 to DK increases in proportion to the time when the voltage of the ramp wave signal VR decreases.

The PGA circuit 11 amplifies each of the dark and bright signals sequentially provided from the pixel circuit P of the corresponding column selected by the row scanning circuit 4, through the signal line SL, by a given amplification factor. The amplification factor of the PGA circuit 11 can be changed.

The comparator 12 samples and holds the output signal of the PGA circuit 11. Then, the comparator 12 compares the voltage level between the voltage of the held signal and the voltage of the ramp wave signal VR, and outputs a signal indicating the comparison result. When the voltage of the ramp wave signal VR decreases lower than the voltage of the held signal which is output from the PGA circuit 11, the output signal of the comparator 12 is switched from "H" level to "L" level.

In response to the switching of the output signal of the Comparator 12 from "H" level to "L" level, the latch circuit 13 latches the count signals D1 to DK generated by the counter 15. Then, the latch circuit 13 outputs the latched count signals D1 to DK as the A/D conversion results. In this way, the digital signals D1 to DK of the dark and bright signals are generated for each cycle period.

Figure 3:
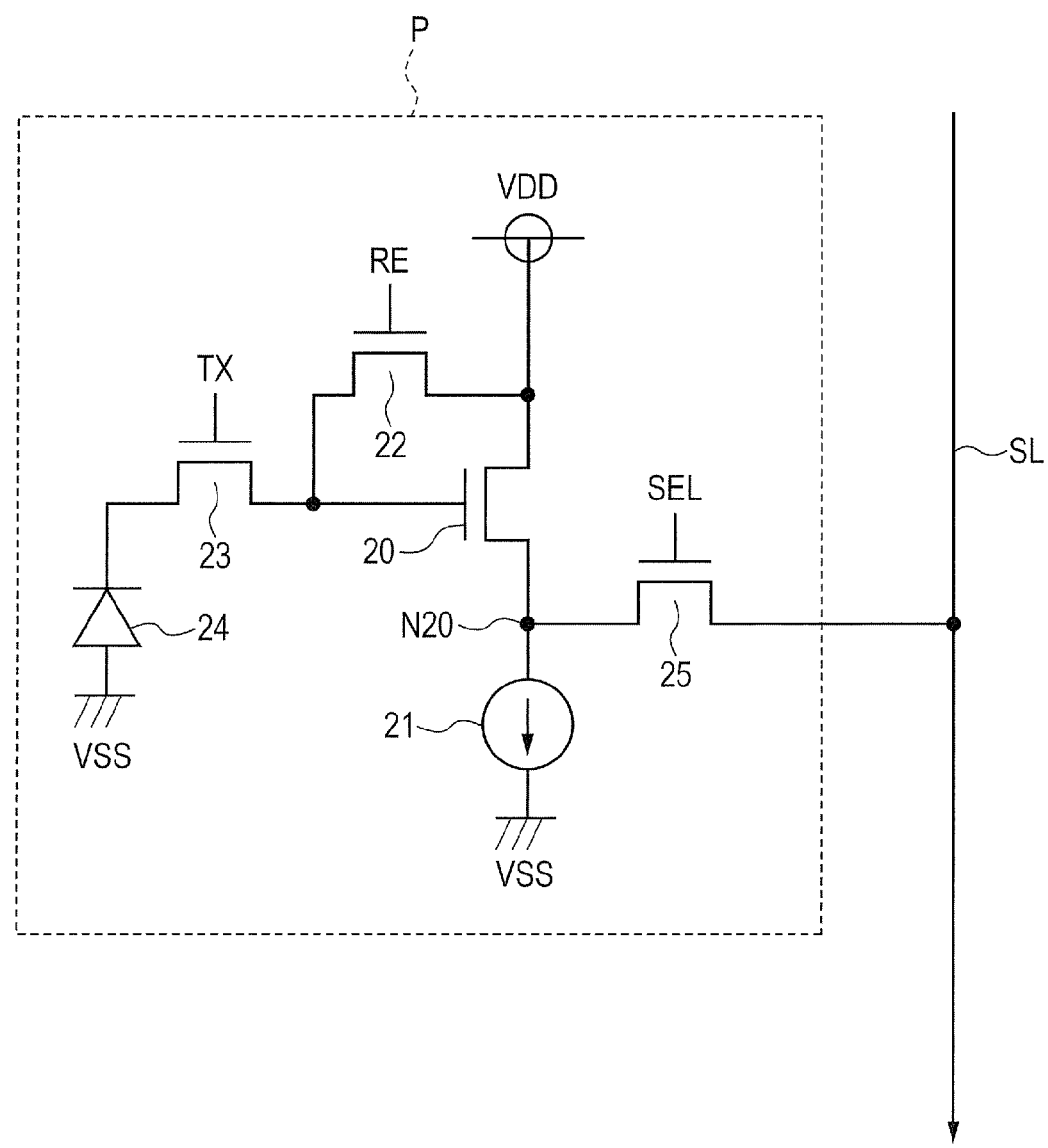
FIG. 3 is a circuit diagram showing the configuration of a pixel circuit shown in FIG. 2.

FIG. 3 is a circuit diagram showing the configuration of the pixel circuit P shown in FIG. 2. In FIG. 3, the pixel circuit P includes N channel MOS transistors 20, 22, 23, 25, a constant current supply 21, and a photodiode 24. The transistor 20 and the constant current supply 21 are coupled in series between the line of a power supply voltage VDD and the line of a ground voltage VSS. The transistor 22 is coupled between the drain and gate of the transistor 20. The gate of the transistor 22 receives a reset signal RE.

The drain of the transistor 23 is coupled to the gate of the transistor 20. The gate of the transistor 23 receives a read signal TX. The anode of the photodiode 24 is coupled to the ground voltage VSS. Then, the cathode of the photodiode 24 is coupled to the source of the transistor 23. The drain of the transistor 25 is coupled to the source (node N20) of the transistor 20. The source of the transistor 25 is coupled to the corresponding single line SL. Then, the gate of the transistor 25 receives a row selection signal SEL.

The signals SEL, RE, and TX are generated by the row scanning circuit 4. When the selection level of the selection signal SEL is switched to "H" level, the transistor 25 is made conductive, so that the node N20 of the pixel circuit P and the signal line SL are coupled to each other. When the activation level of the reset signal RE is switched to "H" level, the transistor 22 is made conductive, so that the gate of the transistor 20 is reset to the power supply voltage VDD. Then, a dark signal is output to the node N20. When the activation level of the read signal TX is switched to "H" level, the transistor 23 is made conductive. The current of a level corresponding to the intensity of the light incident on the photodiode 24 flows out of the gate of the transistor 20. The gate voltage of the transistor 20 decreases, so that the current flowing through the transistor 20 decreases. Then, the voltage of the node N20 decreases. At this time, the signal appearing in the node N20 is the bright signal.

Figure 4:
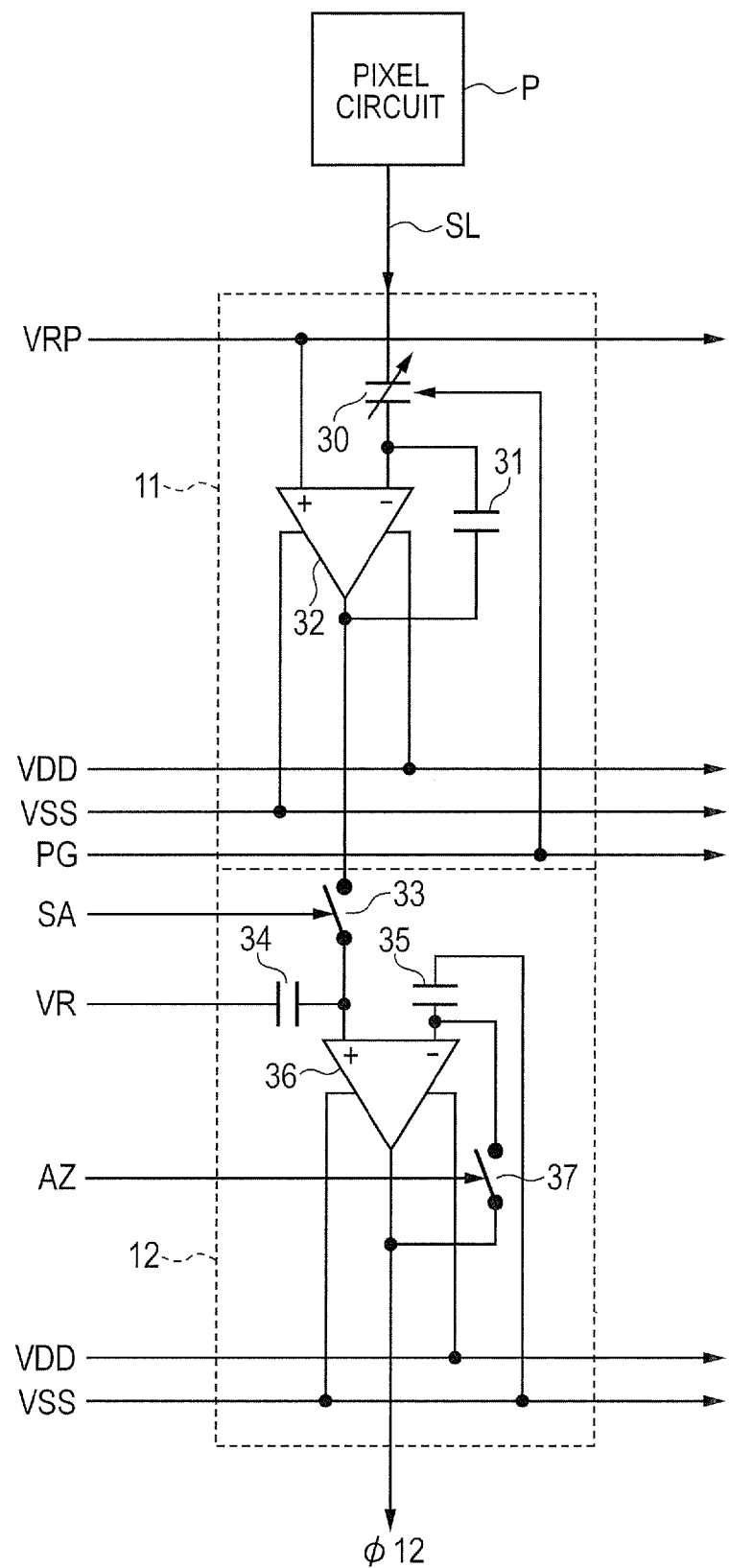
FIG. 4 is a circuit block diagram of the configuration of a PGA circuit and a comparator shown in FIG. 2.

FIG. 4 is a circuit block diagram of the configuration of the PGA circuit 11 and the comparator 12 shown in FIG. 2. In FIG. 4, the PGA circuit 11 includes a variable capacitance capacitor 30, a capacitor 31, and an operational amplifier 32. The variable capacitance capacitor 30 is coupled between the corresponding signal line SL and an inverting input terminal (negative terminal) of the operational amplifier 32. The capacitance value is controlled by a signal PG. The capacitor 31 is coupled between the inverting input terminal and the output terminal of the operational amplifier 32. A non-inverting input terminal (positive terminal) of the operational amplifier 32 receives a reference voltage VRP.

The operational amplifier 32 is driven by the power supply voltage VDD and the ground voltage VSS. The amplification factor of the PGA circuit 11 is determined by the ratio of the capacitance value of the variable capacitance capacitor 30 to the capacitance value of the capacitor 31. The operational amplifier 32 amplifies each of the dark and bright signals provided through the signal line SL from the pixel circuit P. Then, the operational amplifier 32 outputs the amplified dark and bight signals to the comparator 12.

The comparator 12 includes switches 33 and 37, capacitors 34 and 35, and an operational amplifier 36. The switch 33 is coupled between the output terminal of the operational amplifier 32 and a non-inverting input terminal of the operational amplifier 36. The switch 33 is controlled by a signal SA. One side electrode of the capacitor 34 receives the ramp wave signal VR, and the other side electrode is coupled to the non-inverting input terminal of the operational amplifier 36.

The capacitor 35 is coupled between the inverting input terminal of the operational amplifier 35 and the line of the ground voltage VSS. The switch 37 is coupled between the output terminal and the non-inverting input terminal of the operational amplifier 36. The switch 37 is controlled by a single AZ. The operational amplifier 32 is driven by the power supply voltage VDD and the ground voltage VSS.

The output voltage of the pixel circuit P is amplified by the PGA circuit 11. In the sampling period, the single SA is switched to "H" level and the switch 33 is made conductive. At the same time, the signal AZ is switched to "H" level and the switch 37 is made conductive. The voltage of the inverting input terminal and the voltage of the non-inverting input terminal are the same in the operational amplifier 36. Then, the capacitor 35 is charged to the output voltage of the PGA circuit 11.

In the hold period, the signal SA is switched to "L" level and the switch 33 is made non-conductive. At the same time, the signal AZ is switched to "L" level and the switch 37 is made non-conductive. The non-inverting input terminal of the operational amplifier 36 is reset to the reference voltage. Then, the voltage of the ramp wave signal VR decreases from the top voltage VRT to the bottom voltage VRB. In response to this change, the voltage of the non-inverting input terminal of the operational amplifier 36 also decreases. When the voltage of the non-inverting input terminal becomes lower than the voltage of the non-inverting input terminal in the operational amplifier 36, an output signal $\phi 12$ of the operational amplifier 36 is switched from "H" level to "L" level.

Figure 5:
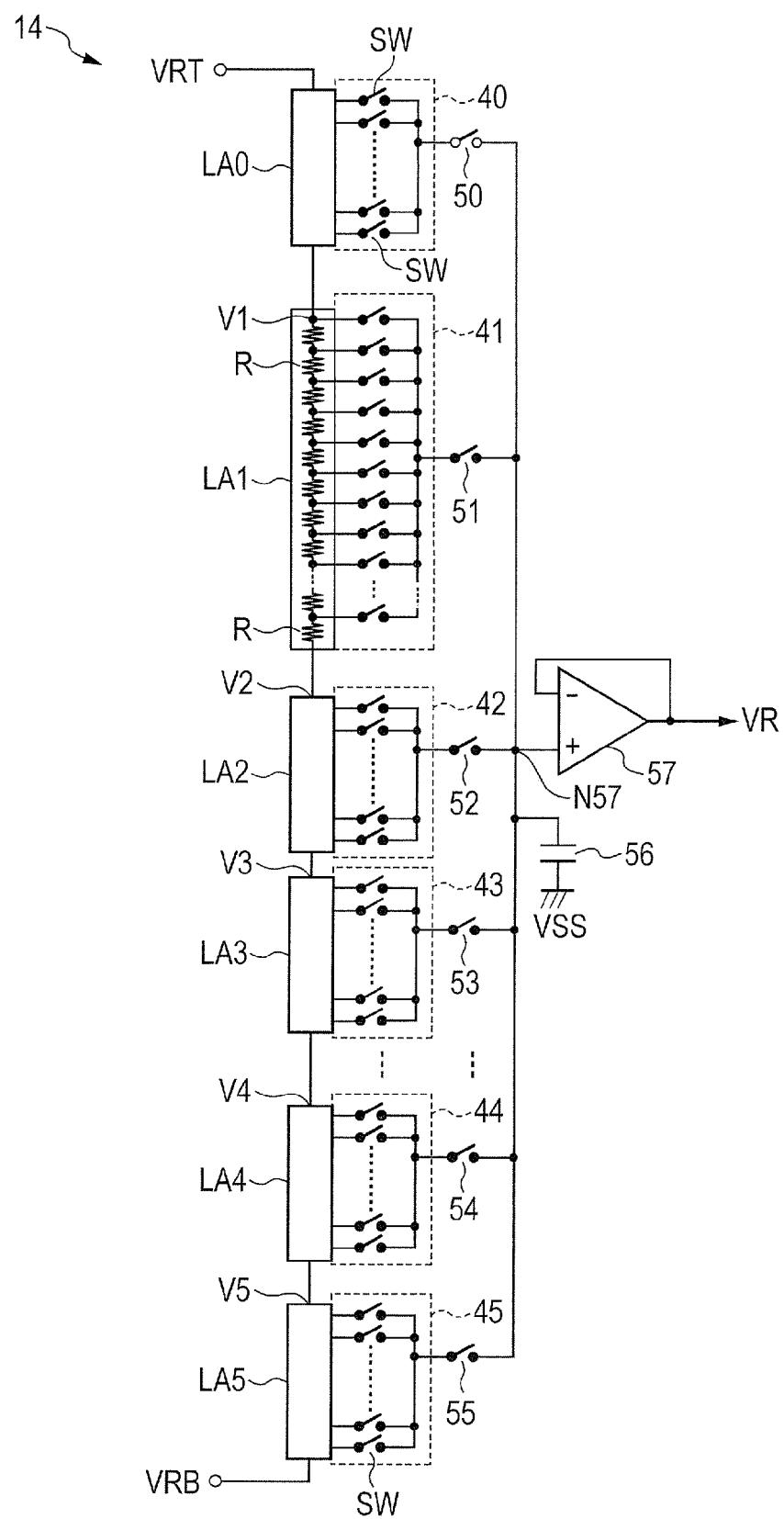
FIG. 5 is a circuit block diagram of the configuration of a ramp wave generation circuit shown in FIG. 2.

FIG. 5 is a circuit block diagram of the configuration of the ramp wave generation circuit 14 shown in FIG. 2. In FIG. 5, the ramp wave generation circuit 14 includes ladder resistors LA0 to LA5, switching circuits 40 to 45, switches 50 to 55, a capacitor 56, and an operational amplifier 57. The ladder resistors LA0 to LA5 are coupled in series between the line of the top voltage VRT and the line of the bottom voltage VRB. Each of the ladder resistors LA0 to LA5 includes N resistance elements R (where N is an integer, and for example, $2^8=256$) that are coupled in series.

The voltage between the top voltage VRT and the bottom voltage VRB is divided by the ladder resistors LA0 to LA5. Further, the voltage between the terminals of each of the ladder resistors LA0 and LA5 is divided by N resistance elements R. The voltages V1 to V5 of the terminals on the side of the top voltage VRT of the ladder resistors LA1 to LA5 are, for example, 2 V, 1.75 V, 1.5 V, 1.25 V, and 1 V, respectively. The voltages VRT to V1 are used as the upper margin voltage of the ramp wave signal VR. The voltages V1 to V5 are used as the effective range voltage of the ramp wave signal VR. The voltages V5 to VRB are used as the lower margin voltage of the ramp wave signal VR.

The switching circuits 40 to 45 are coupled to the ladder resistors LA0 to LA5, respectively. Each of the switching circuits 40 to 45 includes N switches SW. One side terminals of the N switches SW are coupled to the terminals on the side of the top voltage VRT of the N resistance elements (not shown) of the ladder resistor LA0, respectively. The other side terminals of the N switches SW of the switching circuit 40 are all coupled to a node N57 through the switch 50. When N switches SW are made conductive sequentially at predetermined time intervals during a period when the switch 50 is conductive, the voltage of the node N57 decreases from VRT to approximately V1 at a constant rate of voltage VL/N (for example, approximately 1 mV) per a predetermined time. Here, VL is the voltage between the terminals of each of the ladder resistors LA0 to LA5.

One side terminals of the N switches SW of the switching circuit 41 are coupled to the terminals on the side of the top voltage VRT of the N resistance elements R of the ladder resistor LA1. Then, ails the other side terminals of the switches SW are coupled to the node N57 through the switch 51. When N switches SW are made conductive sequentially at predetermined time intervals during a period when the switch 50 is conductive, the voltage of the node N57 decreases from V1 to approximately V2 at a constant rate of voltage VL/N per a predetermined time.

Similarly, one side terminals of the switches SW of the switching circuits 42 to 45 are coupled to the terminals on the side of the top voltage VRT of the ladder resistors LA2 to LA5, respectively. The other side terminals of the switches SW of the switching circuits 42 to 45 are coupled to the node N57 through the switches 52 to 55, respectively.

The capacitor 56 is coupled between the node N57 and the line of the ground voltage VSS to stabilize the voltage of the node N57. The non-inverting input terminal of the operational amplifier 57 is coupled to the node N57. Then, the output terminal of the operational amplifier 57 is coupled to the inverting input terminal. Thus, the voltage of the ramp wave signal VR, which is the output voltage of the operational amplifier 57, is equal to the voltage of the node N57.

When the ramp wave signal VR for dark signal is generated, multiple switches SW belonging to the switching circuits 40 and 41 are made conductive from the side of the top voltage VRT to the side of the bottom voltage VRB sequentially at predetermined time intervals, with all the switches 50 to 55 being in a conductive state. In this way, the voltage of the ramp wave signal VR decreases from the voltage VRT to approximately V2 at a constant tilt angle.

Further, when the ramp wave signal VR for bright signal is generated, all the switches belonging to the switching circuits 40 to 45 are made conductive from the side of the top voltage VRT to the side of the bottom voltage VRB sequentially at predetermined time intervals, with all the switches 50 to 55 being in a conductive state. In this way, the voltage of the ramp wave signal VR decreases from the voltage VRT to the bottom voltage VRB at a constant tilt angle.

Figure 6:
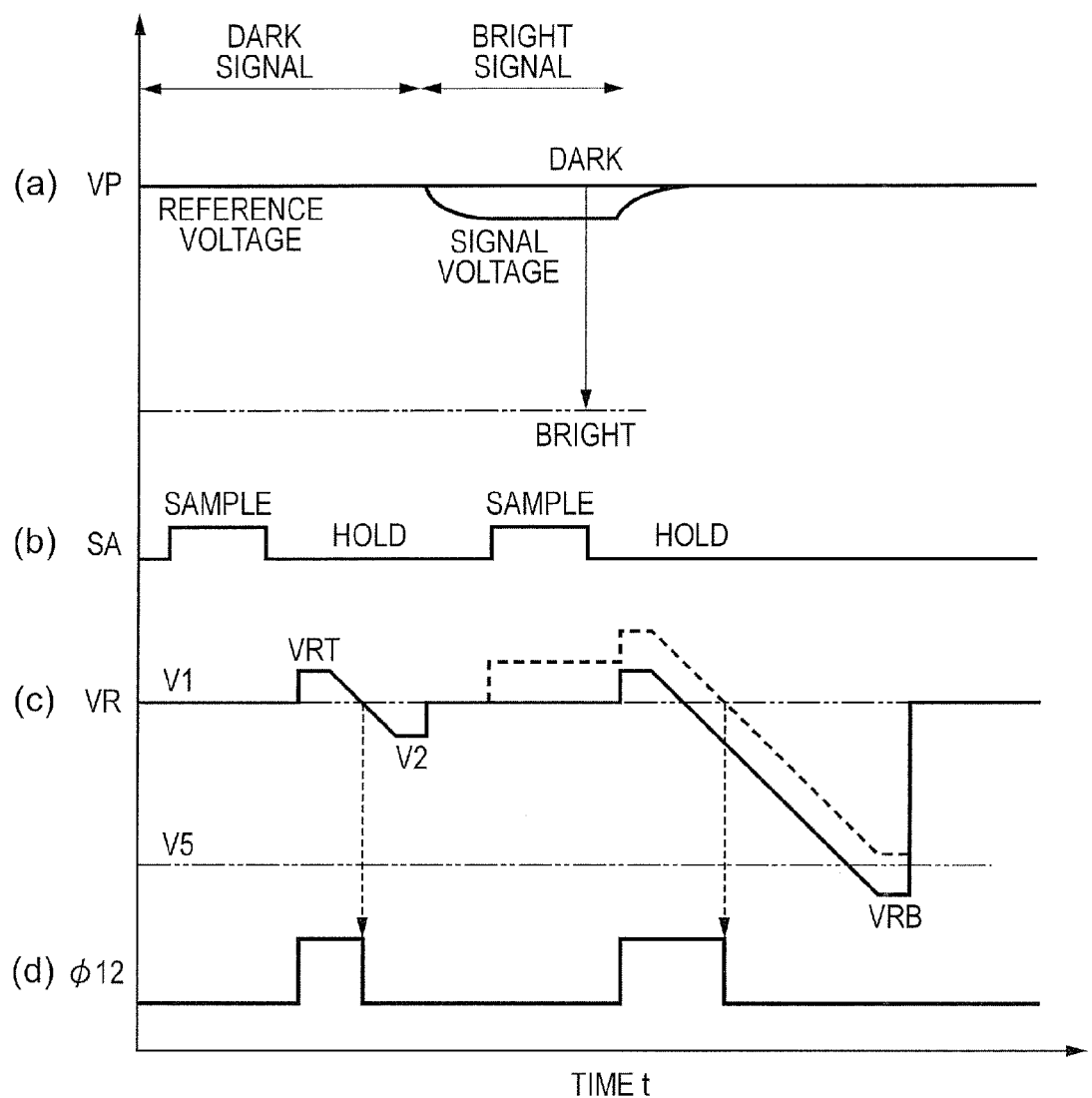
FIGS. 6A to 6D are time charts showing the operation of the CMOS image sensor shown in FIGS. 1 to 5.

FIGS. 6A to 6D are time charts showing examples of the operation of the CMOS image sensor 1. FIG. 6A shows an output voltage VP of the pixel circuit P, FIG. 6B shows the signal SA shown in FIG. 4, the solid line in FIG. 6C shows the ramp wave signal VR, the dashed line in FIG. 6C shows the input voltage of the comparator 12, and FIG. 6D shows the output signal φ12 of the comparator 12.

As shown in FIG. 6A, the pixel circuit P sequentially outputs dark and bright signals. The dark signal has a reference voltage, while the bright signal has a signal voltage of a level corresponding to the illuminance. When the illuminance is 0, the voltage of the bright signal is the reference voltage. The voltage of the bright signal decreases as the illuminance increases.

Further, as shown in FIG. 6B, the logic level of the signal SA varies in synchronization with the output signal of the pixel circuit P. When a dark signal is output from the pixel circuit P, the signal SA is switched to "H" level for a predetermined time and the voltage of the dark signal is sampled. Then, the signal SA is switched to "L" level and is held in this state. Further, when a bright signal is output from the pixel circuit P, the signal SA is switched to "H" for a predetermined time and the voltage of the bright signal is sampled. Then, the signal SA is switched to "L" level and is held in this state.

Further, as shown in FIG. 6C, the ramp wave signal VR is output in the dark signal hold time and in the bright signal hold time, respectively. In the initial state, the switches 50 and 51, as well as the switch SW on the side closest to the top voltage VRT of the switching circuit 41 are made conductive. At this time, the voltage of the ramp wave signal VR is V1.

In the dark signal hold time, the ramp wave signal VR for dark signal is generated. The voltage of the ramp wave signal VR for dark signal is switched to the top voltage VRT for a predetermined time. Then, the voltage of the ramp wave signal VR decreases to V2 at a constant tilt angle, which is then held at V2 for a predetermined time and is reset to V1. When the voltage of the ramp wave signal VR is switched to VRT from V1, as shown in FIG. 6D, the output signal φ12 of the comparator 12 is switched to "H" level from "L" level. Further, the counter 15 in FIG. 2 increments the value of the count signals D1 to DK, sequentially, as the voltage of the ramp signal decreases.

When the voltage of the ramp wave signal VR is lower than the output voltage (the amplified voltage of the dark signal) of the PGA circuit 11, the output signal φ12 of the comparator 12 is switched to "L" level from "H" level. In FIG. 6C it is shown that the signal φ12 is switched to "L" level when the voltage of the ramp wave signal VR is V1 or less. In response to the falling edge of the signal φ12, the latch circuit in FIG. 2 holds and outputs the count signals D1 to DK. The value of the output signals D1 to DK of the latch circuit 15 represents the voltages of the dark signal (the reference voltages).

Further, in the bright signal hold time, the ramp wave signal VR for bright signal is generated. The voltage of the ramp wave signal VR for bright signal is switched to the top voltage VRT for a predetermined time. Then, the voltage of the ramp wave signal VR decreases to the bottom voltage VRB at a constant tilt angle, which is then held at VRB for a predetermined time and is reset to V1. When the voltage of the ramp wave signal VR is switched to VRT from V1, as shown in FIG. 6D, the output signal φ12 of the comparator 12 is switched to "H" level from "L" level. Further, the counter 15 of FIG. 2 increments the value of the count signals D1 to DK, sequentially, as the voltage of the ramp wave signal VR decrease.

When the voltage of the ramp wave signal VR becomes lower than the output voltage (the amplified voltage of the bright signal) of the PGA circuit 11, the output signal φ12 of the comparator 12 is switched to "L" level from "H" level. In response to the falling edge of the signal φ12, the latch circuit 15 in FIG. 2 holds and outputs the count signals D1 to DK. The value of the output signals D1 to DK of the latch circuit 15 represents the voltage of the bright signal (the signal voltage).

In the first comparative example, the resolution of the A/D converter 10 is constant independent of the illuminance. The resolution of the A/D converter 10 can be adjusted according to a low illuminance area that requires high resolution, so that the resolution of the A/D converter 10 is set to high for all illuminance areas. For this reason, the time required for the A/D conversion is increased, and it is difficult to increase the operation speed.

First Embodiment

Figure 7:
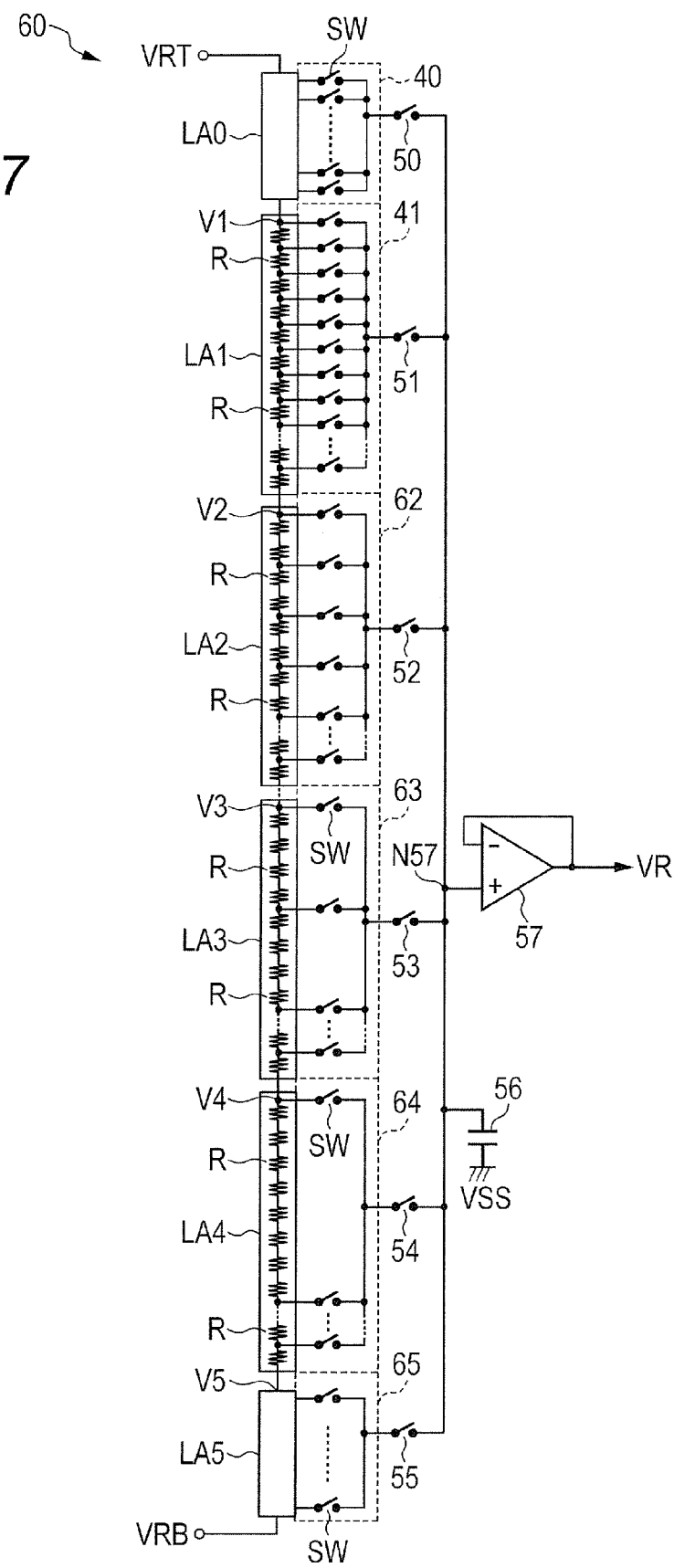
FIG. 7 is a circuit diagram showing the configuration of a ramp wave generation circuit included in a CMOS image senor according to a first embodiment of the present invention.

FIG. 7 is a circuit block diagram of the configuration of a ramp wave generation circuit 60 included in a CMOS image sensor according to a first embodiment of the present invention. FIG. 7 is contrasted with FIG. 5. With reference to FIG. 7, the difference in the ramp wave generation circuit 60 from the ramp wave generation circuit 14 in FIG. 7 is that the switching circuits 42 to 45 are replaced by switching circuit 62 to 65, respectively.

The switching circuit 62 includes N/2 (for example 128) switches SW. One side terminals of the N/2 switches SW of the switching circuit 62 are coupled to the terminals on the side of the top voltage VRT of odd numbered resistance elements of the N/2 resistance elements R of the ladder resistor LA2. Then, all the other side terminals of the N/2 switches SW are coupled to the node N57 through the switch 52. When N/2 switches SW are made conductive sequentially at predetermined time intervals during a period when the switch 52 is conductive, the voltage of the node N57 decreases from V2 to approximately V3 at a constant rate of voltage 2 VL/N (for example, 2 mV) per a predetermined time.

The switching circuit 63 includes N/4 (for example 64) switches SW. One side terminals of the N/4 switches SW of the switching circuit 63 are coupled to the terminals on the side of the top voltage VRT of the (4n+1)th resistance elements R of the N/4 resistance elements R of the ladder resistor LA3. All the other side terminals of the N/4 switches SW are coupled to the node N57 through the switch 53, where n is an integer of 0 or more. When the N/4 switches SW are made conductive sequentially at predetermined time intervals during a period when the switch 53 is conductive, the voltage of the node N57 decreases from V3 to approximately V4 at a constant rate of voltage 4 VL/N (for example, approximately 4 mV) per a predetermined time.

The switching circuit 64 includes N/8 (for example, 32) switches SW. One side terminals of the N/8 switches SW of the switching circuits 64 are coupled to the terminals on the side of the top voltage VRT of the (8n+1)th resistance elements of the N/8 resistance elements R of the ladder resistor LA4. Then, all the other side terminals of the N/8 switches SW are coupled to the node N57 through the switch 54. When the N/8 switches SW are made conductive sequentially at predetermined time intervals during a period when the switch 54 is in a conductive state, the voltage of the node N57 decreases from V3 to V4 at a constant rate of voltage 8 VL/N (for example, approximately 8 mV) per a predetermined time.

The switching circuit 65 includes N/8 switches SW. One side terminals of the N/8 switches SW of the switching circuit 65 are coupled to the terminals on the side of the top voltage VRT of the (8n+1)th resistance elements R of the N/8 resistance elements R (not shown) of the ladder resistor LA5. Then, all the other side terminals of the N/8 switches SW of the switching circuit 65 are coupled to the node N57 through the switch 55. When the N/8 switches SW are made conductive sequentially at predetermined time intervals during a period when the switch 55 is conductive, the voltage of the node N57 decreases from V4 to VRB at a constant rate of voltage 8 VL/N per a predetermined time.

The switches 50 to 55 are made conductive. Then, the multiple switches SW included in the switching circuits 40, 41, and 62 to 65 are made conductive sequentially at predetermined time intervals from the VRT side to the VRB side. In this state, the voltage of the ramp wave signal VR decreases from VRT to VRB. When assuming that v is the falling speed of the voltage of the ramp wave signal VR in the period when the switches SW of the switching circuits 40 and 41 are sequentially made conductive, the falling speed of the voltage of the ramp wave signal VR is 2v, 2v, 8v, and 8v, respectively, in the period when the switches of the switching circuits 42, 43, 44, 45 are sequentially made conductive. Thus, in the effective range of V1 to V5 of the ramp wave signal VR, the falling speed of the voltage of the ramp wave signal VR increases as time passes. As a result, the resolution on the low illuminance side increases and the resolution on the high illuminance side decreases.

FIGS. 8A to 8D are time charts showing examples of the operation of the CMOS image sensor both in the case of the low illuminance and in the case of the high illuminance. FIG. 8A shows the output voltage VP of the pixel circuit P, FIG. 8B shows the signal SA in FIG. 4, the solid line in FIG. 8C shows the ramp wave signal VR, the dashed line in FIG. 8C shows the input voltage of the comparator 12, and FIG. 8D shows the output signal φ12 of the comparator 12.

As shown in FIG. 8A, the pixel circuit P outputs dark and bright signals, sequentially. The dark signal has a reference voltage, and the bright signal has a signal voltage of a level corresponding to the illuminance. When the illuminance is 0, the voltage of the bright signal is the reference voltage. The voltage of the bright signal decreases as the illuminance increases. Thus, the voltage of the bright signal in the case of the high illuminance is smaller than the voltage of the bright signal in the case of the low illuminance.

Further, as shown in FIG. 8B, the logic level of the signal SA varies in synchronization with the output signal of the pixel circuit P. When a dark signal is output from the pixel circuit P, the signal SA is switched to "H" level for a predetermined time and the voltage of the dark signal is sampled. Then, the signal SA is switched to "L" level and is held in this state. Further, when a bright signal is output from the pixel circuit P, the signal SA is switched to "H" level for a predetermined time and the voltage of the bright signal is sampled. Then, the signal SA is switched to "L" level and is held in this state.

Further, as shown in FIG. 8C, the ramp wave signal VR is output in the dark signal hold time and in the bright signal hold time, respectively. In the initial state, the switch 51 and the switch SW on the side closest to the top voltage VRT in FIG. 7 are made conductive. At this time, the voltage of the ramp wave signal VR is V1.

In the dark signal hold time, first the switches 50 and 51 in FIG. 7 are made conductive. Then, the switch SW on the side closest to the top voltage VT is made conductive. At this time, the voltage of the ramp wave signal VR is the top voltage VRT. When the voltage of the ramp wave signal VR is switched to VRT from V0, the output signal φ12 of the comparator 12 is switched to "H" level from "L" level.

Next, N switches SW of the switching circuit 40 as well as N switches SW of the switching circuit 41 are made conductive, sequentially, at predetermined time intervals. In this way, the voltage of the ramp wave signal VR decreases from VRT to approximately V2 at a constant tilt angle. Further, at this time, the counter 15 increments the value of the count signals D1 to DK sequentially.

When the voltage of the ramp wave signal VR becomes lower than the output voltage (the amplified voltage of the dark signal) of the PGA circuit 11, the output signal φ12 of the comparator 12 is switched to "L" level from "H" level. In FIG. 8C it is shown that the signal φ12 is switched to "L" level when the voltage of the ramp wave signal VR decreases to V1 or lower. In response to the falling edge of the signal φ12, the latch circuit 15 in FIG. 2 holds and outputs the digital signals D1 to DK. The output signals D1 to DK of the latch circuit 15 represent the voltage (reference voltage) of the dark signal.

Further, in the bright signal hold time, first the switches 50 to 55 are made conductive. Then, the switch SW on the side closest to the top voltage VRT of the switching circuit 40 is made conductive. At this time, the voltage of the ramp wave signal VR is the top voltage VRT. When the voltage of the ramp wave signal VR is switched to VRT from V1, the output signal φ12 of the comparator 12 is switched to "H" level from "L" level.

Next, N switches SW of the switching circuit 40, N switches SW of the switching circuit 41, N/2 switches SW of the switching circuit 62, N/4 switches SW of the switching circuit 63, N/8 switches of the switching circuit 64, and N/8 switches SW of the switching circuit 65 are made conductive, sequentially, at predetermined time intervals. In this way, the voltage of the ramp wave signal VR decreases from VRT to VRB. The inclination of the ramp wave signal VR on the side of the bottom voltage VRB (high illuminance side) is greater than the inclination of the ramp wave signal VR on the side of the top voltage VRT (low illuminance side).

Further, at this time, the counter 15 increments the value of the count signals D1 to DK, sequentially. When the voltage of the ramp wave signal VR becomes lower than the output voltage (the amplified voltage of the bright signal) of the PGA circuit 11, the output signal φ12 of the comparator 12 is switched to "L" level from "H" level. In response to the falling edge of the signal φ12, the latch circuit 15 in FIG. 2 holds and outputs the count signals D1 to DK. The value of the output signals D1 to DK represents the voltage (signal voltage) of the bright signal. The voltage of the bright signal in the case of the high illuminance is lower than the voltage of the bright signal in the case of the low illuminance. Thus, the value of the digital signals D1 to DK in the case of the high illuminance is greater than the value of the digital signals D1 to DK in the case of the low illuminance.

In the first embodiment, the resolution is set to low in the high illuminance area. Thus, the dynamic range can be increased and the time required for the AD conversion can be reduced as compared to the first comparative example.

Further, according to the first embodiment, a high illuminance exposure period (short exposure period) and a low illuminance exposure period (long exposure period) are provided in one frame period. In this configuration, each of the pixel circuits P is exposed twice and outputs dark and bright signals twice. Then, the output dark and bright signals are converted into digital signals, respectively, and are combined together.

Figure 9:
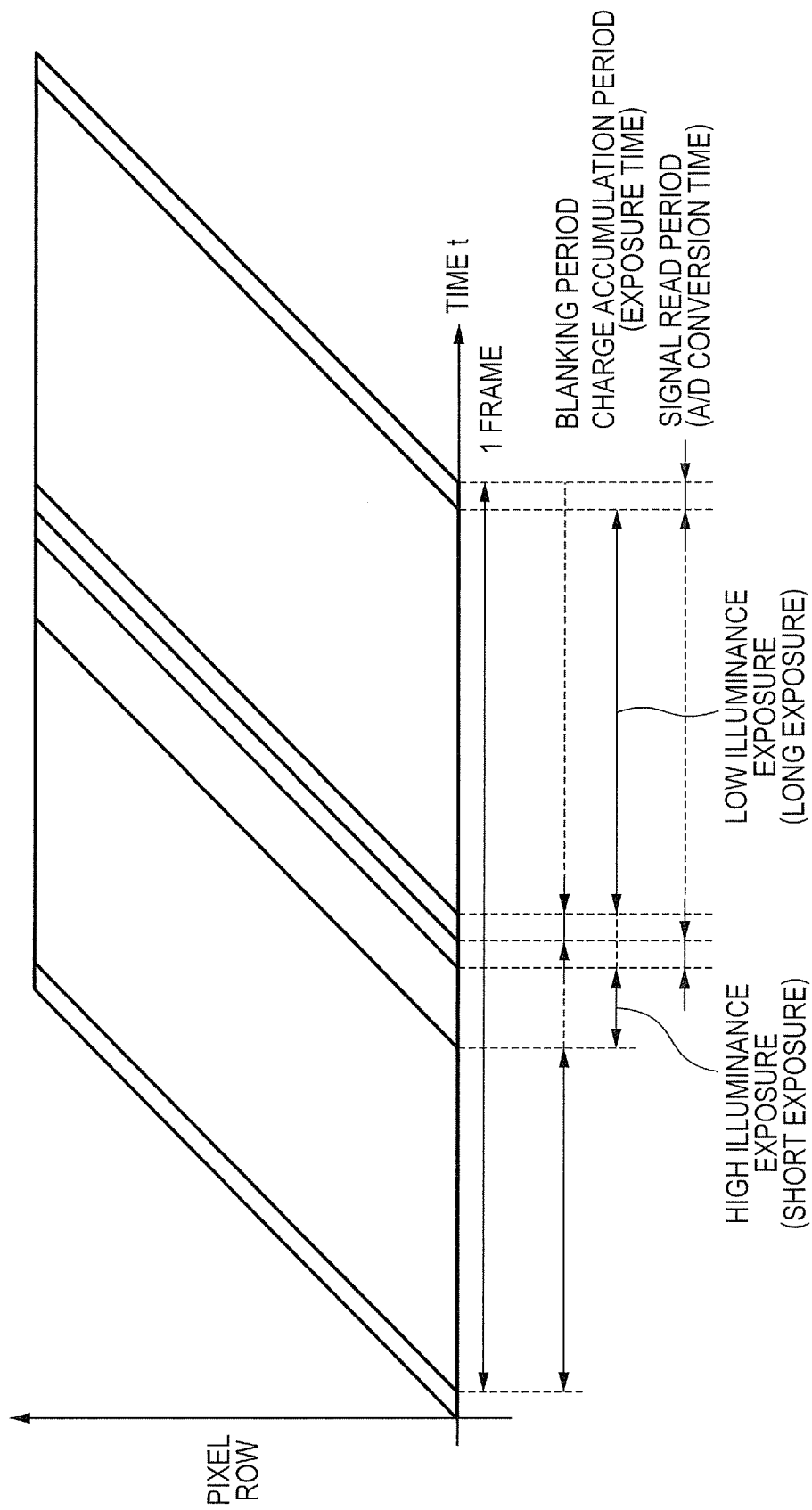
FIG. 9 is a time chart of a rolling shatter operation of the CMOS image sensor descried with reference to FIG. 7.

FIG. 9 is a time chart showing the rolling shatter method of the CMOS image sensor according to the first embodiment. In this CMOS image sensor, exposure is performed twice: high illuminance exposure (short exposure) and low illuminance exposure (long exposure). The reset, exposure, and signal reading are performed sequentially in each exposure period.

The output signals of the pixel circuits P of the individual rows are A/D converted, sequentially, at intervals of the single reading period from the first row, the second row, the third row, and so on until the last row. The time for one frame is given as follows: the signal reading period×the number of pixel rows×the number of times of exposure. Thus, in the first embodiment, the signal reading period can be reduced, so that the time for one frame can also be reduced. As a result, it is possible to increase the frame rate, namely, to speed up the frame rate.

Further, it is possible to set the length of the exposure time by adjusting the timing of the end of the reset time. For example, it is possible to set the short exposure time for high illuminance first, and then set the long exposure time for low illuminance.

Figure 10:
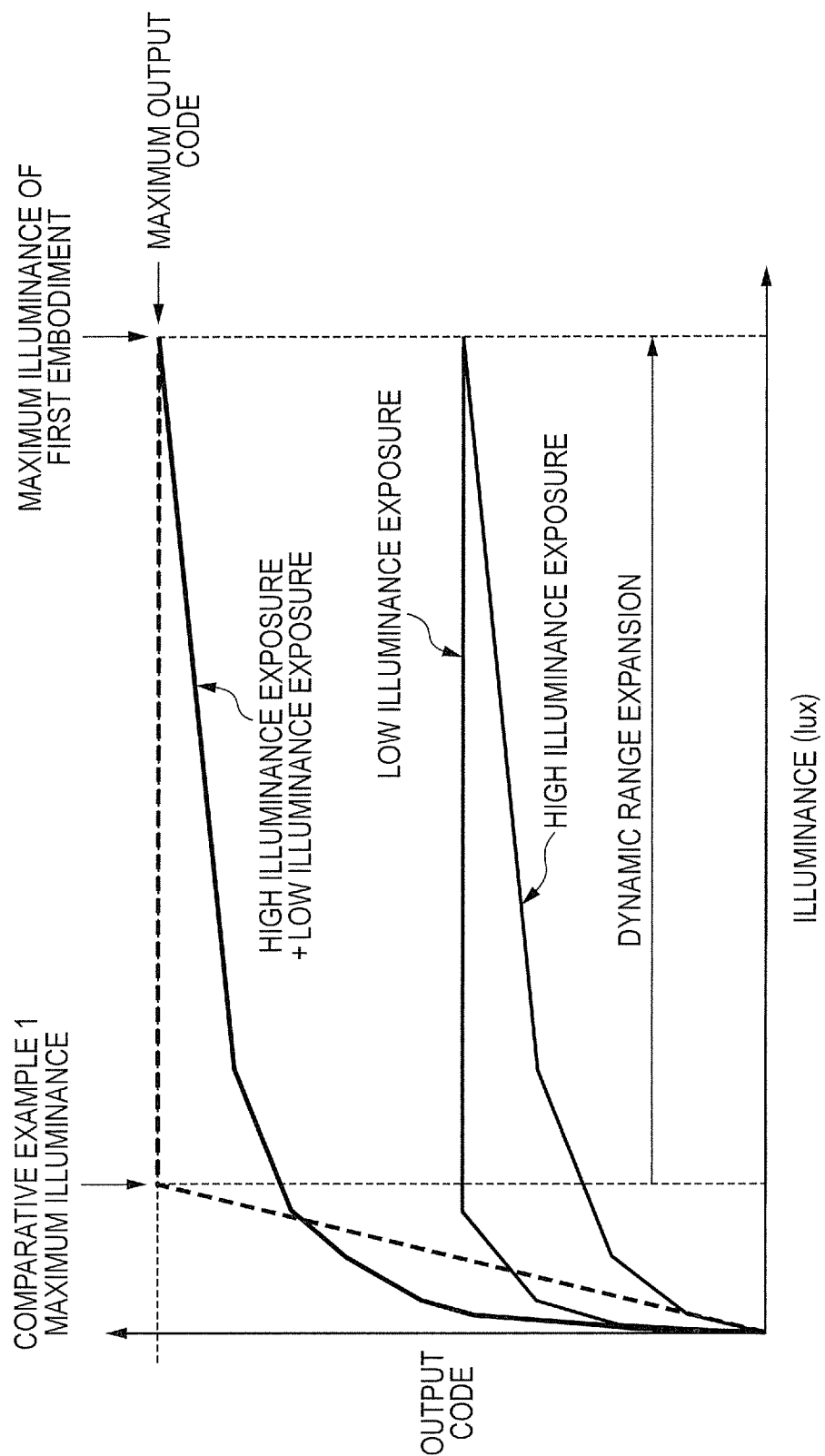
FIG. 10 is a view of the effect of the first embodiment.

FIG. 10 is a view of the relationship between the illuminance and the output code (the value of the digital signals D1 to DK). In FIG. 10, the curve of the first embodiment is shown by the solid line, and the curve of the first comparative example is shown by the dashed line. In the case of high illuminance exposure (short exposure), the exposure time is short, so that the output code for illuminance is small. The output code gradually increases according to the illuminance. As a result, the output code is not saturated even in the high illuminance area. Further, in the case of low illuminance exposure (long exposure), the exposure time is long, so that the output code for illuminance is large. The output code rapidly increases according to the illuminance, and the output code is saturated in the high illuminance area.

When the curve of the high illuminance exposure is added to the curve of the low illuminance exposure, the output code gradually increases according to the illuminance. In this way, it is possible to obtain a desirable curve that reaches the maximum output code with relatively large illuminance. On the other hand, in the first comparative example, the output code rapidly increases according to the illuminance, so that the curve reaches the maximum output code with relatively small illuminance. Thus, according to the first embodiment, it is possible to obtain a dynamic range greater than that of the first comparative example.

Further, compared to the existing HDR imaging in which the dynamic range is increased entirely in the digital domain, the first embodiment is advantageous in that the need for redundant bits in the A/D conversion can be eliminated by combining the processes in the analog domain. Thus, it is possible not only to speed up the AD conversion but alto to prevent the increase of the circuit area and power consumption.

Second Embodiment

Figure 11:
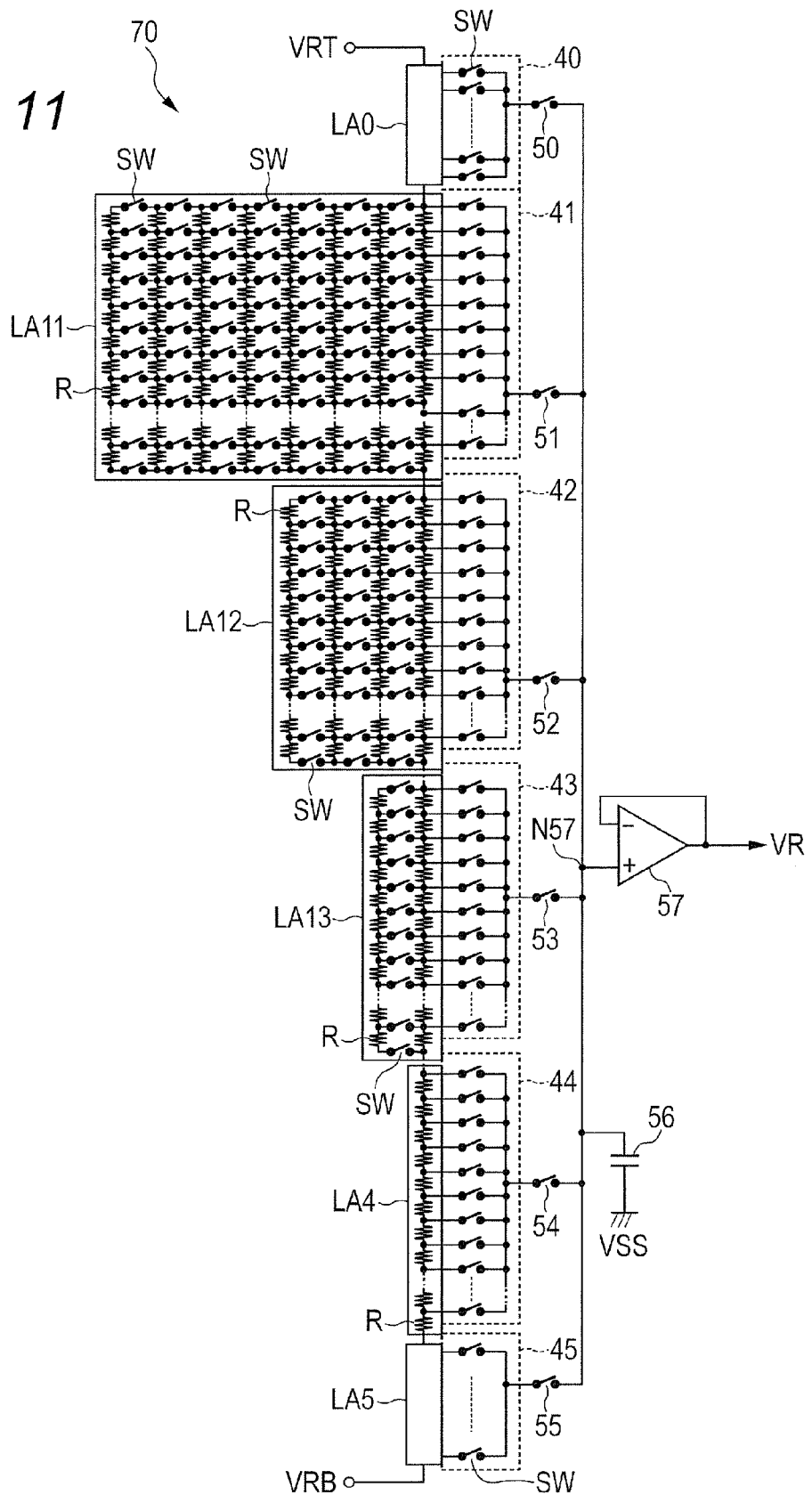
FIG. 11 is a circuit diagram showing the configuration of a ramp wave generation circuit included in a CMOS image sensor according to a second embodiment of the present invention.

FIG. 11 is a circuit block diagram of the configuration of a ramp wave generation circuit 70 included in a CMOS image sensor according to a second embodiment of the present invention. FIG. 11 is contrasted with FIG. 5. With reference to FIG. 11, the difference in the ramp wave generation circuit 70 from the ramp wave generation circuit 14 in FIG. 5 is that the ladder resistors LA1 to LA3 are replaced by ladder resistors LA11 to LA13, respectively.

The ladder resistor LA11 includes 8N resistance elements R arranged in N rows and 8 columns, and 7(N+1) switches SW arranged in (N+1) rows and 7 columns. N resistance elements R in each column are coupled in series. One side terminals of the N switches SW of the switching circuit 41 are coupled to the terminals on the side of the top voltage VRT of N resistance elements R in the first column as seen from the switching circuit 41.

The (N+1) switches SW arranged in 7 columns are provided between each of the N resistance elements R arranged in 8 columns. One side terminals of the (N+1) switches SW in each column are coupled between the series-coupled N resistance elements R adjacent to one side, and are coupled to both sides thereof. The other side terminals of the (N+1) switches SW in each column are coupled between the series-coupled N resistance elements R adjacent to the other side, and are coupled to both sides thereof.

In the ladder resistor LA11, it is possible to couple a desired number of resistance elements R of the resistance elements R of the second to eighth columns, in parallel to the resistance elements R of the first column by controlling 7(N+1) switches SW. When the resistance elements R of the first column are coupled in parallel to the resistance elements R of the other column, the voltage drop in the resistance elements R of the first column is reduced. Then, the falling speed of the voltage of the ramp wave signal VR is reduced when the N switches SW of the switching circuit 41 are sequentially made conductive.

For example, when all the switches SW of the first column seen from the side of the switching circuit 41 is made conductive, the resistance elements R of the second column are coupled in parallel to the resistance elements R of the first column in each of the rows. Then, the falling speed of the ramp wave signal VR becomes one half. Further, when all the switches SW in all the columns are made conductive, the resistance elements R (8 in total) of the first to eighth columns are coupled in parallel in each of the rows. Then, the falling speed of the ramp wave signal VR becomes one eighth.

The ladder resistor LA12 includes 4N resistance elements R arranged in N rows and 4 columns, and 3(N+1) switches SW arranged in (N+1) rows and 3 columns. N resistance elements R in each column are coupled in series. One side terminals of the N switches SW of the switching circuit 42 are respectively coupled to the terminals on the side of the top voltage VRT of the N resistance elements R of the first column seen from the switching circuit 42.

The (N+1) switches SW arranged in three columns are provided between each of the N resistance elements R arranged in four columns, respectively. One side terminals of the (N+1) switches SW in each of the columns are coupled between the series-coupled N resistance elements R adjacent to one side, and are coupled to both sides thereof.

The other side terminals of the (N+1) switches SW in each of the columns are coupled between the series-coupled N resistance elements R adjacent to the other side, and are coupled to both sides thereof.

In the ladder resistor LA12, it is possible to couple a desired number of resistance elements R of the resistance elements R in the second to fourth columns, in parallel to the resistance elements R of the first column by controlling 3(N+1) switches SW. When the resistance elements R of the first column are coupled in parallel to the resistance elements R of the other column, the voltage drop in the resistance elements R of the first column is reduced. Then, the falling speed of the voltage of the ramp wave signal VR is reduced when the N switches of the switching circuit 42 are sequentially made conductive.

For example, when all the switches SW of the first column seen from the side of the switching circuit 42 are made conductive, the resistance elements R of the second column are coupled in parallel to the resistance elements R of the first column in each of the rows. Then, the falling speed of the ramp wave signal VR becomes one half. Further, when all the switches SW of all the columns are made conductive, the resistance elements R (4 in total) of the first to fourth columns are coupled in parallel in each of the rows. Then, the falling speed of the ramp wave signal VR becomes one fourth.

The ladder resistor LA13 includes 2N resistance elements R arranged in N rows and 2 columns, and (N+1) switches SW arranged in (N+1) rows and one column. N resistance elements R of each column are coupled in series. One side terminals of the N switches SW of the switching circuit 43 are coupled to the terminals on the side of the top voltage VRT of the N resistance elements R of the first column seen from the switching circuit 43, respectively.

The (N+1) switches SW arranged in one column are provided between the N resistance elements R arranged in two columns, respectively. One side terminals of the (N+1) switches SW are coupled between each of the series-coupled N resistance elements R adjacent to one side, and to both ends thereof. The other side terminals of the (N+1) switches SW are coupled between each of the series-coupled N resistance elements R adjacent to the other side, and to the both ends thereof.

In the ladder resistor LA13, it is possible to couple the resistance elements R of the second column in parallel to the resistance elements R of the first column, by controlling the (N+1) switches SW. When the resistance elements R of the second column are coupled in parallel to the resistance elements R of the first column, the voltage drop in the resistance elements R of the first column is reduced. Then, the falling speed of the voltage of the ramp wave signal VR is reduced to one half when the N switches SW of the switching circuit 42 are sequentially made conductive.

In order to generate the ramp wave signal VR for dark signal, for example, all the switches SW of the ladder resistors LA11 to LA13 are made non-conductive, the switches 50 and 51 are made conductive, and the switches SW (2N in total) of the switching circuits 40 and 41 are made conductive sequentially at predetermined time intervals. In this way, the voltage of the ramp wave signal VR is reduced from VRT to approximately V2 at a constant speed v.

In order to generate the ramp wave signal VR for bright signal, for example, all the switches SW of the ladder resistors LA11 to LA13 are made conductive, all of the switches 50 and 51 are made conductive, and the switches SW (6N in total) of the switching circuits 40 to 45 are made conductive sequentially at predetermined time intervals. In this way, the voltage of the ramp wave signal VR is reduced from VRT to VRB.

Assuming that the falling speed of the ramp wave signal VR is v/8 when the N switches SW of the switching circuit 41 are sequentially made conductive, the falling speed of the ramp wave signal VR when the N switches SW of the switching circuits 42 to 44 are sequentially made conductive is v/4, v/2, and v, respectively. Thus, the inclination of the ramp wave signal VR on the side of the bottom voltage VRB (high illuminance side) is greater than the inclination of the ramp wave signal VR on the side of the top voltage VRT (low illuminance side).

In the second embodiment, the resolution is set to high in the low illuminance area, so that the dynamic range can be increased as compared to the first comparative example.

Second Comparative Example

Figure 12:
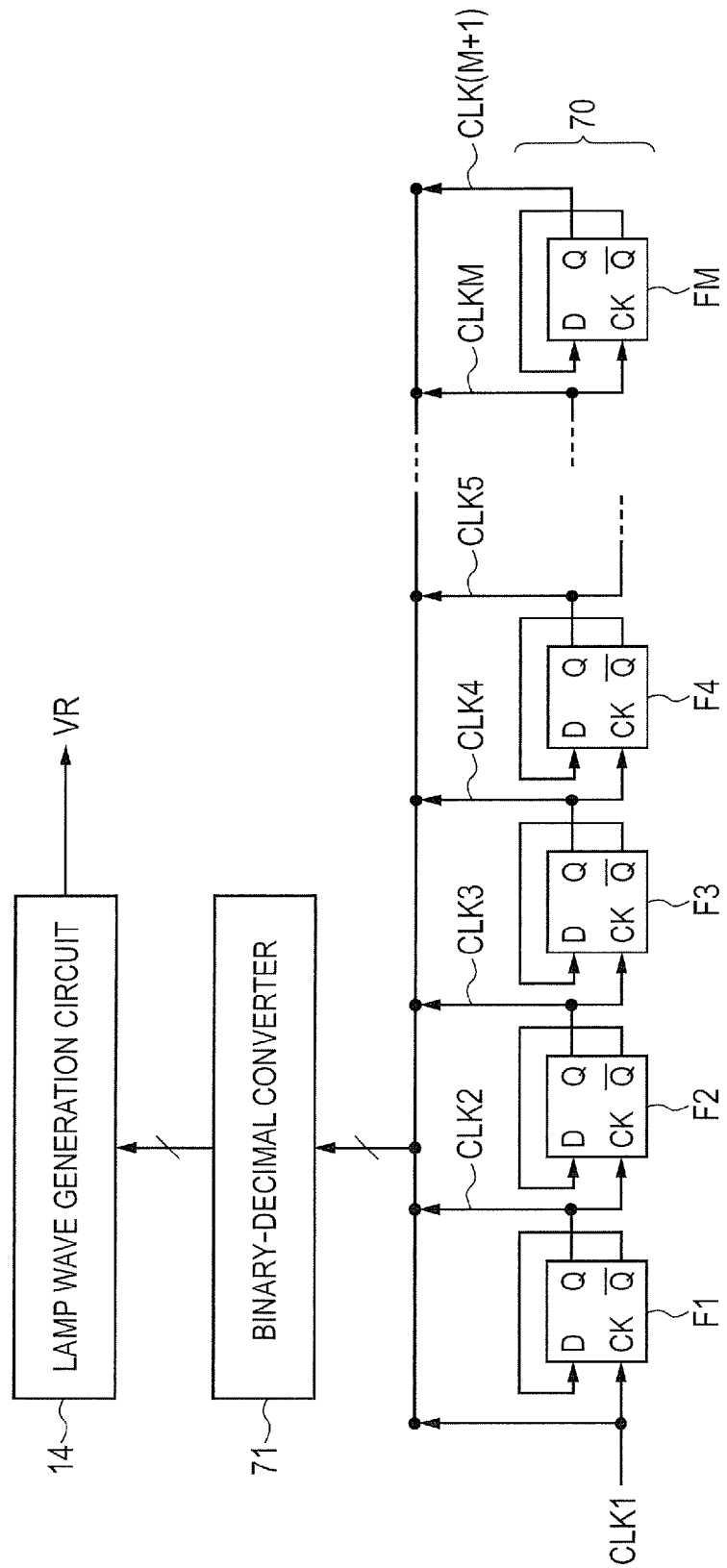
FIG. 12 is a block diagram showing the main part of a CMOS image sensor according to a second comparative example of the present invention.
Figure 13:
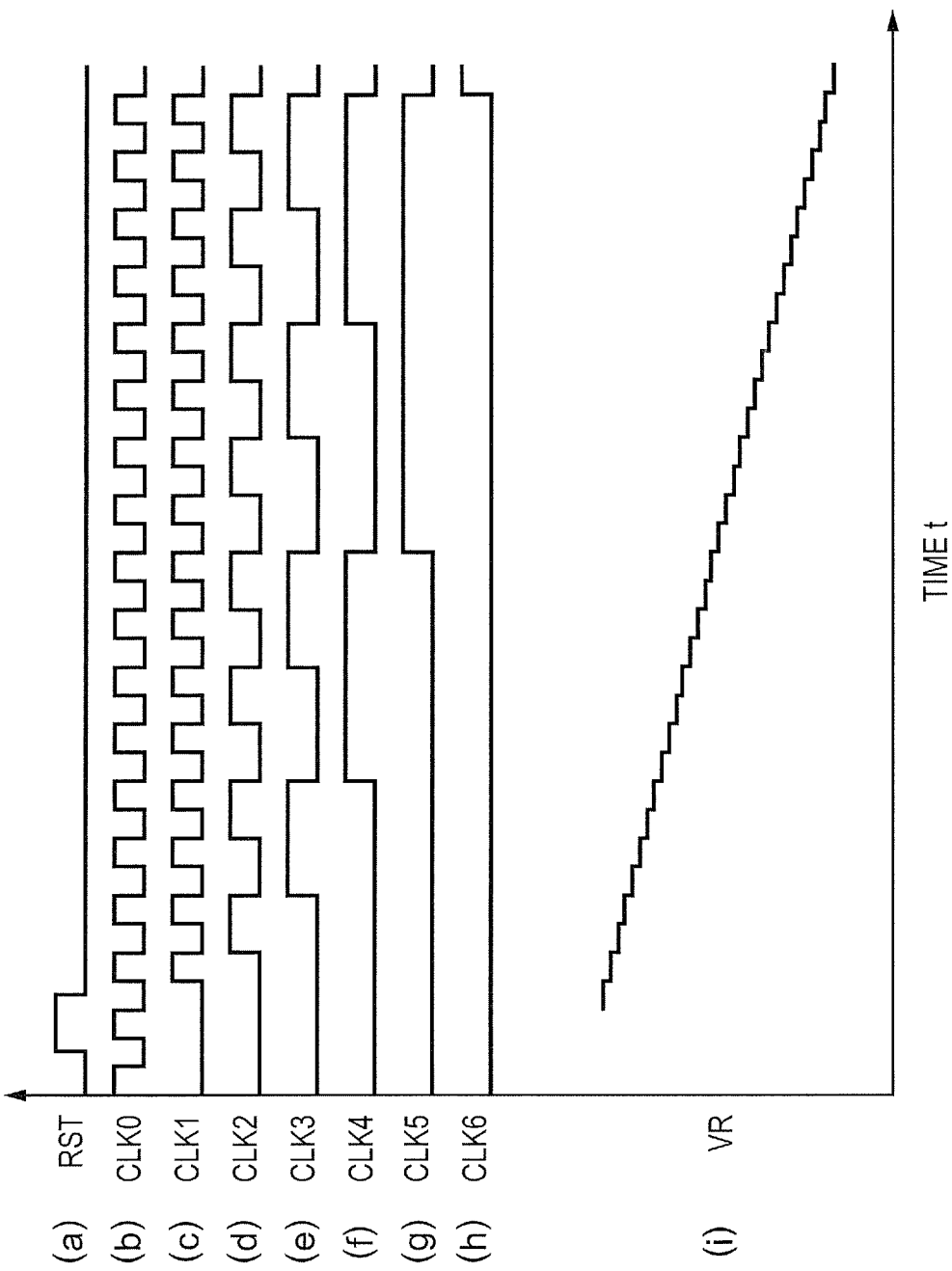
FIGS. 13A to 13J are time charts showing the operation of the CMOS image sensor described with reference to FIG. 12.

FIG. 12 is a circuit block diagram showing the main part of a CMOS image sensor according to a second comparative example of the present invention. In FIG. 12, the CMOS image sensor includes a binary counter 70, a binary-decimal converter 71, and a ramp wave generation circuit 14. The binary counter 70 includes M flip-flops F1 to FM (where M is a natural number) that are coupled in series.

The inverting output terminal (/Q) of each flop-flop F is coupled to an input terminal (D). A clock terminal (CK) of the flip-flop F1 in the first stage receives a clock signal CLK1. The output terminal (Q) of each of the flip-flops F1 to F(M+1) is coupled to the clock terminal (CK) of each of the flip-flops F2 to FM in the subsequent stages. The flip-flops F1 to FM output click signals CLK2 to CLKM. Each flip-flop F configures a two-frequency divider circuit. The binary counter 70 counts the number of edges of the clock signal CLK1, and outputs the count signal representing the count value. The logic level of clock signals CLK1 to CLKM becomes the count signal.

The binary-decimal converter 71 converts a binary count signal that is generated by the binary counter 70 into a decimal count signal. The ramp wave generation circuit 14 includes, as shown in FIG. 5, 6N switches SW. Numbers from 1 to 6N are assigned to the 6N switches SW sequentially from the side of the top voltage VRT. Each switch SW is made conductive only when the number, which is assigned in advance to the particular switch SW, matches the value of the count signal that is generated by the binary-decimal converter 71. Thus, the 6N switches SW are made conductive, sequentially one by one, according to the edge of the clock signal CLK1.

FIGS. 13A to 13I are time charts showing the operation of the CMOS image sensor shown in FIG. 12. FIGS. 13A to 13I show the case of M=6, in which a reference clock signal CLK0 of a predetermined frequency is generated by a clock signal generation circuit (not shown). When a reset signal RST is switched to "H" level from "L" level at a certain time and then is switched to "L" level from "H" level, the reference clock signal CLK0 is given to the binary counter 70 as the clock signal CLK1.

In response to the falling edge of the clock signals CLK1 to CLK5, the logic levels of the respective clock signals CLK2 to CLK6 are inverted. The logic level of each of the clock signals CLK1 to CLK6 is a count signal (binary number) of 6 bits. The value of the count signal (binary number) is incremented by one each time the logic level of the clock signal CLK1 is inverted. The count signal (binary number) is converted into a count signal (decimal number)

by the binary-decimal converter 71. Also the value of the count signal (decimal number) is incremented by one each time the logic level of the clock signal CLK1 is inverted. Thus, each time the count signal (decimal number) is incremented by one, the switches to be made conductive are moved one by one to the side of the bottom voltage VRB. In this way, the voltage of the ramp wave signal VR is reduced from the top voltage VRT to the bottom voltage VRB at a constant tilt angle.

In the second comparative example, also as described in the first comparative example, the resolution of the A/D converter 10 is constant independent of the illumination. Thus, the time required for the A/D conversion is increased and it is difficult to increase the operation speed.

Third Embodiment

Figure 14:
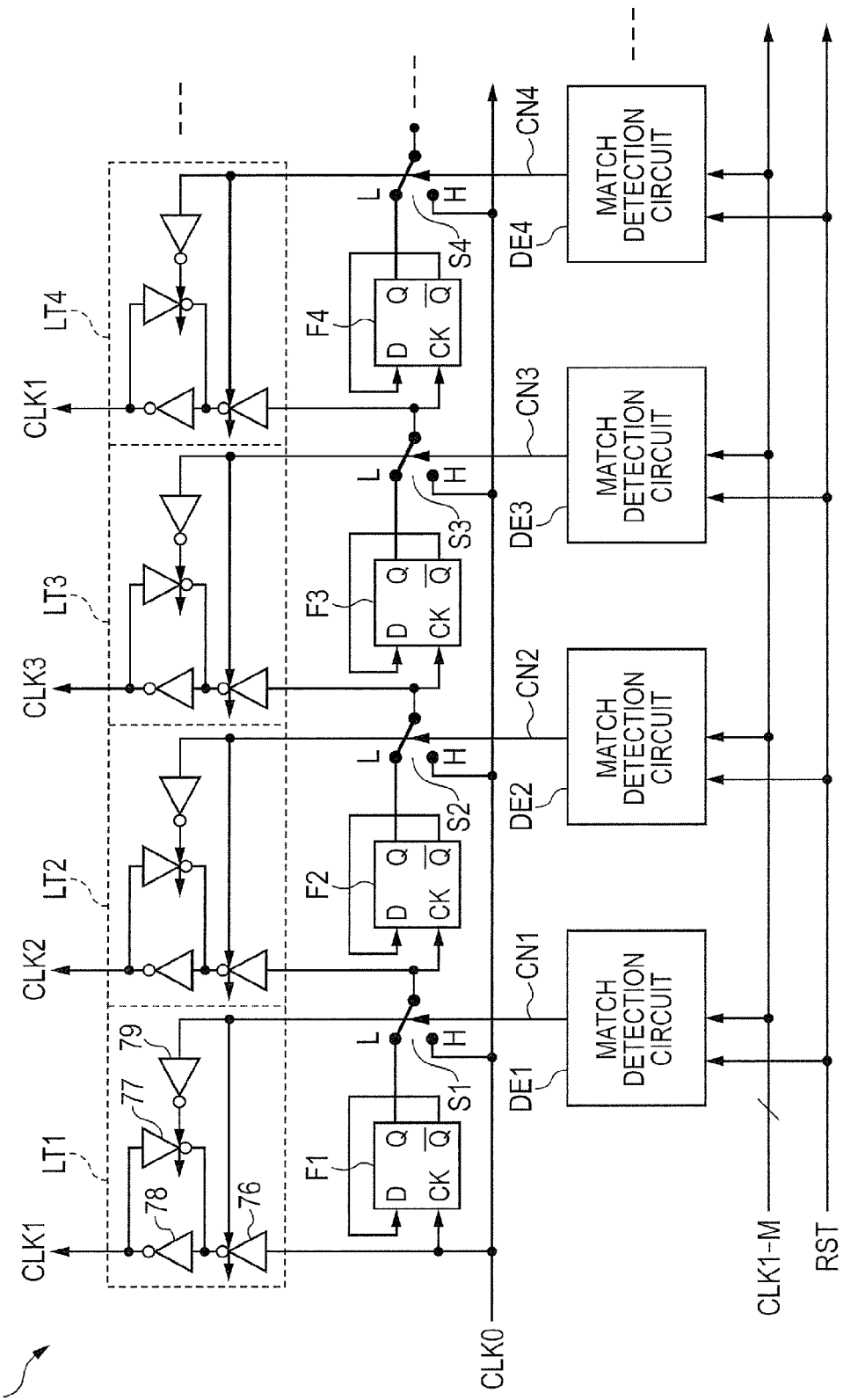
FIG. 14 is a block diagram showing the main part of a CMOS image sensor according to a third embodiment of the present invention.

FIG. 14 is a circuit block diagram of the configuration of a binary counter 75 included in a CMOS image sensor according to a third embodiment of the present invention. FIG. 14 is contrasted with FIG. 12. In FIG. 14, the binary counter 75 includes M sets of flip-flops F1 to FM, switches S1 to SM, latch circuits LT1 to LTM, and match detection circuit DE1 to DEM.

The clock terminal (CK) of the flip-flop F1 in the first stage receives the reference clock signal CLK0. The clock terminals of the flip-flops F2 to FM in the second and subsequent stages are coupled to a common terminal of the switches S1 to S(M−1), respectively. The inverting output terminal (/Q) and input terminal (D) of each flip-flop F are coupled to each other. Each flip-flop F configures a two-frequency divider circuit.

One side terminal of each switch S is coupled to the output terminal (Q) of the flip-flop F of the same group. The other side terminal of each switch S receives the reference clock signal CLK0. The switch S is controlled by the output signal ON of the match detection circuit DE of the same group.

When the signal CN is "L" level, one side terminal of the switch S and the common terminal are made conductive with each other. Then, the output terminal (Q) of the flip-flop F of the same group is coupled to the clock terminal (CK) of the flip-flop F in the subsequent stage. When the signal CN is "H" level, the other side terminal of the switch S and the common terminal are made conductive with each other. Then, the reference clock signal CLK0 is given to the clock terminal (CK) of the flip-flop F in the next stage.

The input terminal of the latch circuit LT1 of the first group receives the reference clock signal CLK0. Then, the input terminals of the latch circuit LT2 to LTM of the second and subsequent groups are coupled to the common terminal of the switches S1 to S(M−1), respectively. The output signals of the latch circuits LT1 to LTM become the clock signals CLK1 to CLKM, respectively.

Each latch circuit LT includes clocked inverters 76 and 77, and inverters 78 and 79. The clocked inverter 76 and the inverter 78 are coupled in series between the input terminal and the output terminal. The clocked inverter 77 is coupled in reverse parallel to the inverter 78. The output signal CN of the match detection circuit DE of the same group is directly input to the control node of the clocked inverter 76, and at the same time, is inverted by the inverter 79 and input to the control node of the clocked inverter 77.

When the signal CN is "L" level, the clocked inverter 76 is activated while the clocked inverter 77 is deactivated. The clocked inverter 76 and the inverter 78 operate as a buffer. Then, the input terminal and the output terminal of the latch circuit LT is brought into a through state. The output node of the deactivated clocked inverter 77 is brought into a high impedance state.

When the signal CN is switched to "H" level from "L" level, the clocked inverter 76 is deactivated while the clocked inverter 77 is activated. The clocked inverter 77 and the inverter 78 operate as a latch circuit to hold the logic level of the output signal. The output node of the deactivated clocked inverter 76 is brought into a high impedance state.

In response to the reset signal RST, each match detection circuit DE resets the signal ON to "L" level. Then, the match detection circuit DE switches the signal CN to "H" level from "L" level, when the logic levels of the clock signals CLK1 to CLKM match the logic levels of the data signals DA1 to DAM which are stored in advance.

Figure 15:
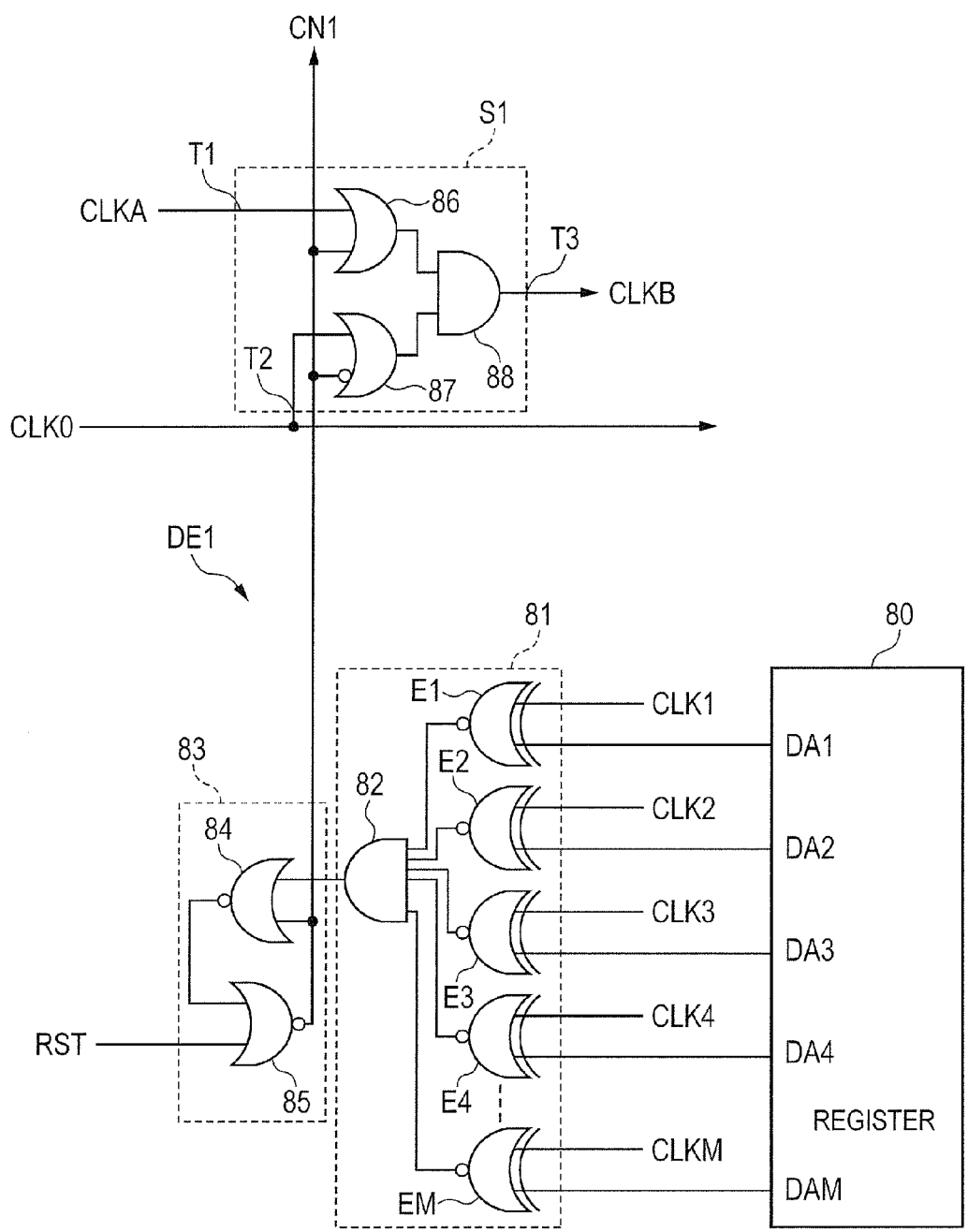
FIG. 15 is a circuit block diagram of the configuration of a match detection circuit and a switch shown in FIG. 14.
Figure 16:
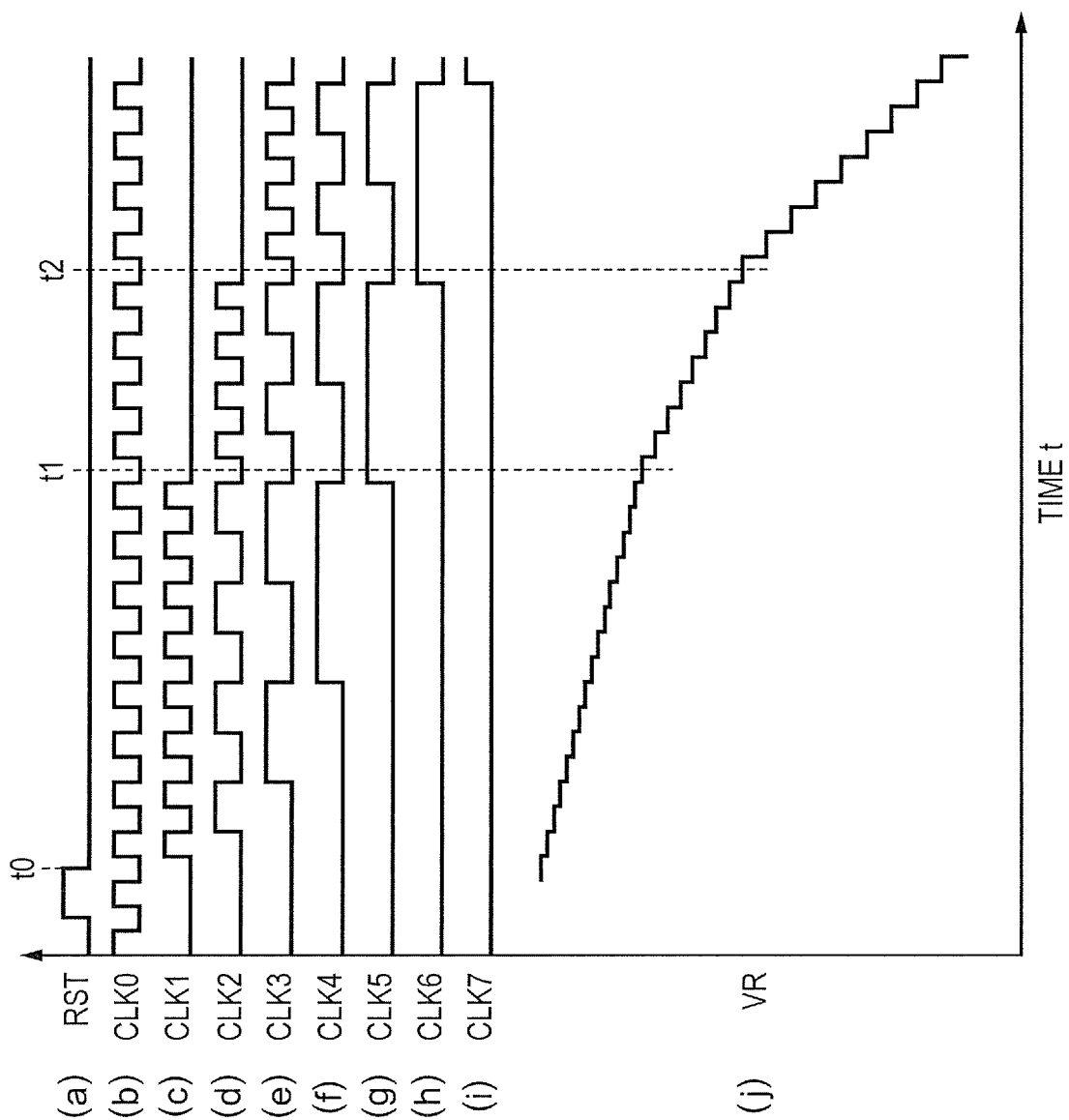
FIGS. 16A to 16J are time charts showing the operation of the CMOS image sensor described with reference to FIG. 14.

FIG. 15 is a circuit block diagram of the configuration of the match detection circuit DE1 and the switch S1. In FIG. 15, the match detection circuit DE1 includes a resister 80, a determination circuit 81, and an RS flip-flop 83. The data signals DA1 to DAM representing the switching timing of the falling speed of the ramp wave signal VR are written in advance in the resister 80.

The determination circuit 81 includes EX-NOR gates E1 to EM and an AND gate 82. One side input nodes of the EX-NOR gates E1 to EM receive the clock signals CLK1 to CLKM, respectively. The other input nodes of the EX-NOR gates E1 to EM receive the data signals DA1 to DAM, respectively. Each EX-NOR gate E outputs a signal of "H" level when the logic levels of the two input signals CLK and DA match. If the two input signals do not match, each EX-NOR gate E outputs a signal of "L" level.

The AND gate 82 receives the output signals of the EX-NOR gate E1 to EM, and outputs the logic product signal of the output signals. Thus, the output signal of the AND gate 82 is "H" level only when all the output signals of the EX-NOR gate E1 to EM are "H" level.

The RS flip-flip 83 includes NOR gates 84 and 85. The NOR gate 84 receives the output signal of the AND gate 82 as well as the output signal of the NOR gate 85. The NOR gate 85 receives the reset signal RST and the output signal of the NOR gate 84, and outputs a signal CN1.

When the reset signal RST is switched to "H" level from "L" level and then is switched to "L" level, the signal CN1 is reset to "L" level. When the output signal of the AND gate 82 is switched to "H" level, the RS flip-flop 83 is reset and the signal CN1 is switched to "H" level.

The switch S1 includes an OR gate 86, a gate circuit 87, and an AND gate 88. The signal CN1 is given to one side input nodes of the NOR gate 86 and the gate circuit 87, respectively. The output signal of the flip-flop F1 in the first stage is given to the other input node of the NOR gate 86 through one side input terminal T1 of the switch S1. The reference clock signal CLK0 is given to the other input node of the gate circuit 87 through the other input terminal T2 of the switch S1. The AND gate 88 generates the logic product signal CLKB of the output signals of the NOR gate 86 and the gate circuit 87. Then, the AND gate 88 outputs the signal CLKB to the clock terminal (CK) of the flip-flop F2 in the next stage through a common terminal T3 of the switch S1.

When the signal CN1 is at "L" level, the output signal of the gate circuit 87 is fixed to "H" level. The clock signal CLKA becomes the signal CLKB by passing through the OR gate 86 and the AND gate 88. When the signal CN1 is at "H" level, the output signal of the OR gate 86 is fixed to "H" level. Then, the reference clock signal CLK0 becomes the signal CLKB by passing through the gate circuit 87 and the AND gate 88.

FIGS. 16A to 16J are time charts showing the operation of the CMOS image sensor shown in FIGS. 14 and 15. FIGS. 13A to 13I show the case of M=7, in which the reference clock signal CLK0 of a predetermined frequency is generated by the clock signal generation circuit (not shown). When the reset signal RST is switched to "H" level from "L" level and then is switched to "L" level from "H" level (time t0), the signals CN1 to CN7 are reset to "L" level.

In this way, one input terminal of each of the switches S1 to S7 and the common terminal are made conductive with each other. Then, the output signal of each flip-flop F is given to the flip-flop F in the subsequent stages. Further, the latch circuits LT1 to LT7 are brought into a through state. The reference clock signal CLK0 becomes the clock signal CLK1 by passing through the latch circuit LT1. Then, the output signals of the flip-flops F1 to F6 become clock signal CLK2 to CLK7 by passing through the latch circuits LT2 to LT7, respectively.

In the first period (times t0 to t1), the logic level of each of the clock signals CLK2 to CLK5 is inverted in response to the falling edge of the clock signals CLK1 to CLK. The logic level of each of the clock signals CLK1 to CLK7 is converted into a count signal (binary number) of 7 bit. The value of the count signal (binary number) is incremented by one each time the logic level of the clock signal CLK1 is inverted.

The count signal (binary number) is converted into a count signal (decimal number) by the binary-decimal converter 71. Also the value of the count signal (decimal number) is incremented by one each time the logic level of the clock signal CLK1 is inverted. Thus, the switches SW to be made conductive are moved one by one to the side of the bottom voltage VRB. In this way, the voltage of the ramp wave signal VR is reduced at a constant speed v from the top voltage VRT.

As time passes and when the logic levels of the clock signals CLK1 to CLK7 match the logic levels of the data signals DE1 to DE7 that are stored in the match detection circuit DE1, the signal CN1 is switched to "H" level from "L" level (time t1).

In this way, the latch circuit LT1 is brought into a hold state, and the logic level of the clock signal CLK1 is held in this state. Further, the other side terminal of the switch S1 and the common terminal are made conducive with each other. Then, the reference clock signal CLK0 is given to the flip-flop F2 and the latch circuit LT2 in the second stage. Then, the frequency of each of the clock signals C1K2 to CLK7 becomes one half. Thus, in the second period (times t1 to t2), the increase speed of the value of the count signal is twice the increase speed in the first period. As a result, the falling speed of the ramp wave signal VR is 2v.

As further time passes and when the logic levels of the clock signals CLK1 to CLK7 match the logic levels of the data signals DE1 to DE7 that are stored in the match detection circuit DE2, the signal CN2 is switched to "H" level from "L" level (time t2).

Because of this, the latch circuit LT2 is brought into a hold state, and the logic level of the clock signal CLK2 is held in this state. Further, the other side terminal of the switch S2 and the common terminal are made conductive with each other. The reference clock signal CLK0 is given to the flip-flop F3 and the latch circuit LT3 in the third stage. Then, the frequency of the clock signals CLK3 to CLK7 becomes one half. Thus, in the third period (after time t2), the increase speed of the value of the count signal is twice the increase speed in the second period. As a result, the falling speed of the ramp wave signal VR is 4v, and so forth.

In the third embodiment, the resolution is set to low in the high illuminance area. Thus, the dynamic range cam be increased and the time required for the A/D conversion can be reduced as compared to the second comparative example.

Note that since the logic level of the clock signal CLK1 is fixed in the second period, it is possible to eliminate the storage element for storing the data signal DA1 of the least significant bit in the resister 80 as well as the EX-NOR gate E1 within the determination circuit 81, from the match detection circuit DE2.

Further, since the logic levels of the clock signals CLK1 and CLk2 are fixed in the third period, it is possible to eliminate the storage element for storing the data signals DA1 and DA2 in the resister 80 as well as the EX-NOR gates E1 and E2 of the determination circuit 81, from the match detection circuit DE3. Similarly, the increase in the circuit scale can be prevented by eliminating unnecessary storage elements and EX-OR gates in the match detection circuits DE4 to DEM.

Fourth Embodiment

Figure 17:
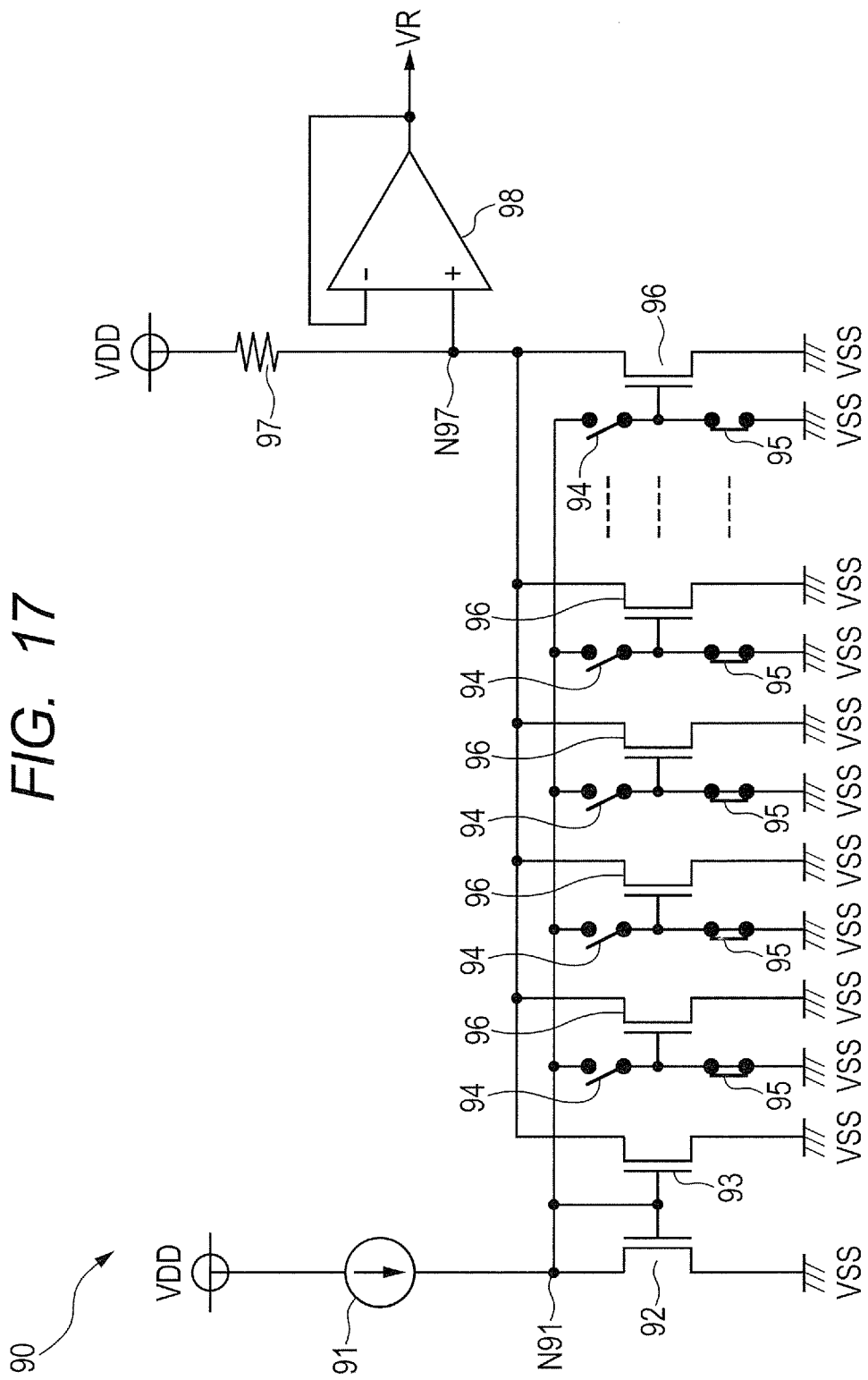
FIG. 17 is a circuit diagram showing the configuration of a ramp wave generation circuit included in a CMOS image sensor according to a fourth embodiment of the present invention.

FIG. 17 is a circuit diagram showing the configuration of a ramp wave generation circuit 90 included in a CMOS image sensor according to a fourth embodiment of the present invention. In FIG. 17, the ramp wave generation circuit 90 includes a constant current supply 91, N channel MOS transistors 92 and 93, multiple sets (for example, 1024 sets) of switches 94, 95 and N channel MOS transistors 96, a resistance element 97, and an operational amplifier 98.

The constant current supply 91 and the transistor 92 are coupled in series between the line of the power supply voltage VDD and the line of the ground voltage VSS. The gate of the transistor 92 is coupled to the drain thereof (node N91). A constant voltage of a level corresponding to a constant current from the constant current supply 91 is generated in the node N91.

The drains of the transistor 93 and multiple transistors 96 are all coupled to the node N97, and all their sources receive the ground voltage VSS. The gate of the transistor 93 is coupled to the node N91. A current of a level corresponding to the current flowing through the transistor 92 flows through the transistor 93.

One side terminals of the switches 94 are all coupled to the node N91, and the other side terminals of the switches 94 are coupled to each of the transistors 96, respectively. Then, one side terminals of the switches 95 are coupled to each of the gates of the transistors 96, respectively, and all the other side terminals of the transistors 96 receive the ground voltage VSS. It ensures that either the switch 94 or 95 is conductive but both are not conductive at the same time.

When the switch 94 of a certain group is made conductive and the switch 95 of the group is made non-conductive, the gate of the transistor 96 of the particular group is coupled to the node N91. Then, a current of a level corresponding to the current flowing through the transistor 92 flows through the transistor 96.

On the other hand, when the switch 94 of a certain group is made non-conductive and the switch 95 of the group is made conductive, the gate of the transistor 96 of the particular group is coupled to the line of the ground voltage VSS. Then, the transistor 96 is made non-conductive.

The resistance element 97 is coupled between the line of the power supply voltage VDD and the node N97. A voltage drop occurs in the resistance element 97 at a value corresponding to the value of the current flowing through the transistor 93 and the multiple transistors 96. Then, the voltage appears in the node N97 at a value determined by subtracting the voltage drop of the resistance element 97 from the power voltage VDD.

The non-inverting input terminal (positive terminal) of the operational amplifier 98 is coupled to the node N97. Then, the output terminal of the operational amplifier 98 is coupled to the inverting input terminal (negative terminal). The operational amplifier 98 outputs the voltage of the same level as the voltage of the node N97, as the ramp wave signal VR.

In the initial state, all the switches 94 are non-conductive, and all the switches 95 are conductive. In this case, all the transistors 96 are made non-conductive, and the constant current flows only through the transistors 92 and 93, respectively. At this time, the current flowing through the resistance element 97 is the minimum value, and the voltage of the ramp wave signal VR is the maximum value.

In A/D conversion, for example, multiple transistors 96 from the leftmost transistor 96 to the rightmost transistor 96 are made conductive sequentially to increase the number of transistors 96 sequentially, by controlling the switches 94 and 95. In this way, the current flowing through the resistance element 97 sequentially increases, and the voltage of the ramp wave signal VR sequentially decreases.

In the related art, the multiple transistors 96 are made conductive sequentially one by one, so that the voltage of the ramp wave signal VR decreases at a constant tilt angle.

However, in the fourth embodiment, the number of transistors 96 to be made conductive at one time is increased at predetermined time intervals. For example, the transistors corresponding to the numbers 0 to 511 of the 1024 transistors 96 are made conductive one by one, the transistors corresponding to the numbers 512 to 767 are made conductive two by two, the transistors corresponding to the numbers 768 to 895 are made conductive four by four, and the transistors corresponding to the numbers 895 to 1024 are made conductive eight by eight. In this way, for example, as shown in FIGS. 16A to 16J, it is possible to increase the falling speed of the voltage of the ramp wave signal VR at predetermined time intervals.

Also in the fourth embodiment, the resolution is set to low in the high illuminance area. Thus, the dynamic range can be increased and the time required for the A/D conversion can be reduced as compared to the related art.

Third Comparative Example

Figure 18:
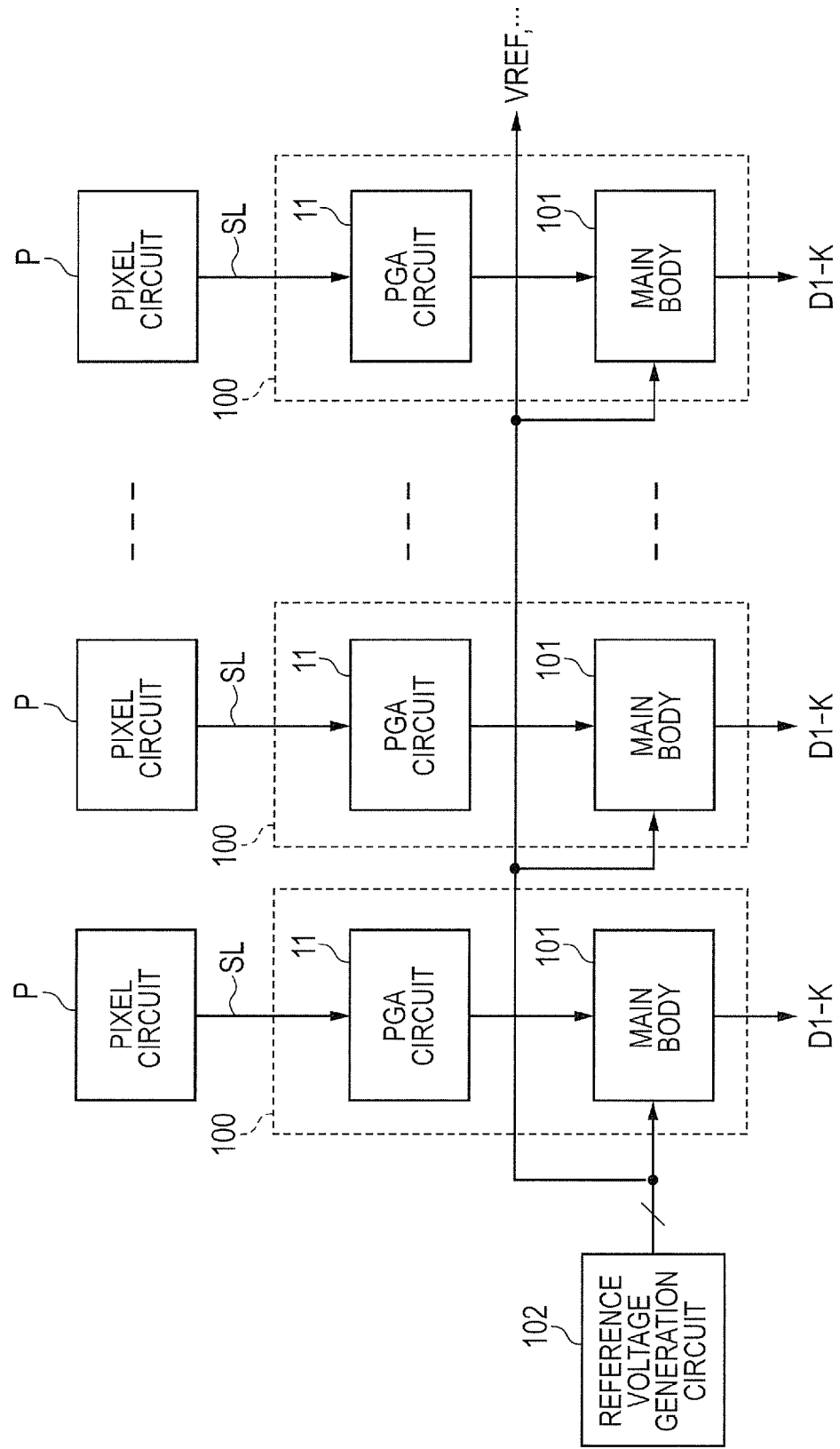
FIG. 18 is a block diagram showing the main part of a CMOS image sensor according to a third comparative example of the present invention.

FIG. 18 is a block diagram showing the main part of a CMOS image sensor according to a third comparative example of the present invention. FIG. 18 is contrasted with FIG. 2. With reference to FIG. 18, the difference in the CMOS image sensor of the third comparative example from the CMOS image sensor of the first embodiment is that the A/D converter 10 is replaced by an A/D converter 100, and a reference voltage generation circuit 102 is provided in place of the ramp wave generation circuit 14 and the counter 15.

The reference voltage generation circuit 102 generates multiple reference voltages VREF, and so on. The A/D converter 100 includes the PGA circuit 11 and a main body 101. The PGA circuit 11 is as shown in FIGS. 2 and 4. The PGA circuit amplifies the output signal of the pixel circuit P and gives the amplified signal to the main body 101. The main body 101 converts the output signal of the PGA circuit 11 into the digital signals D1 to DK, based on the reference voltages VREF and so on, which are provided from the reference voltage generation circuit 102.

Figure 19:
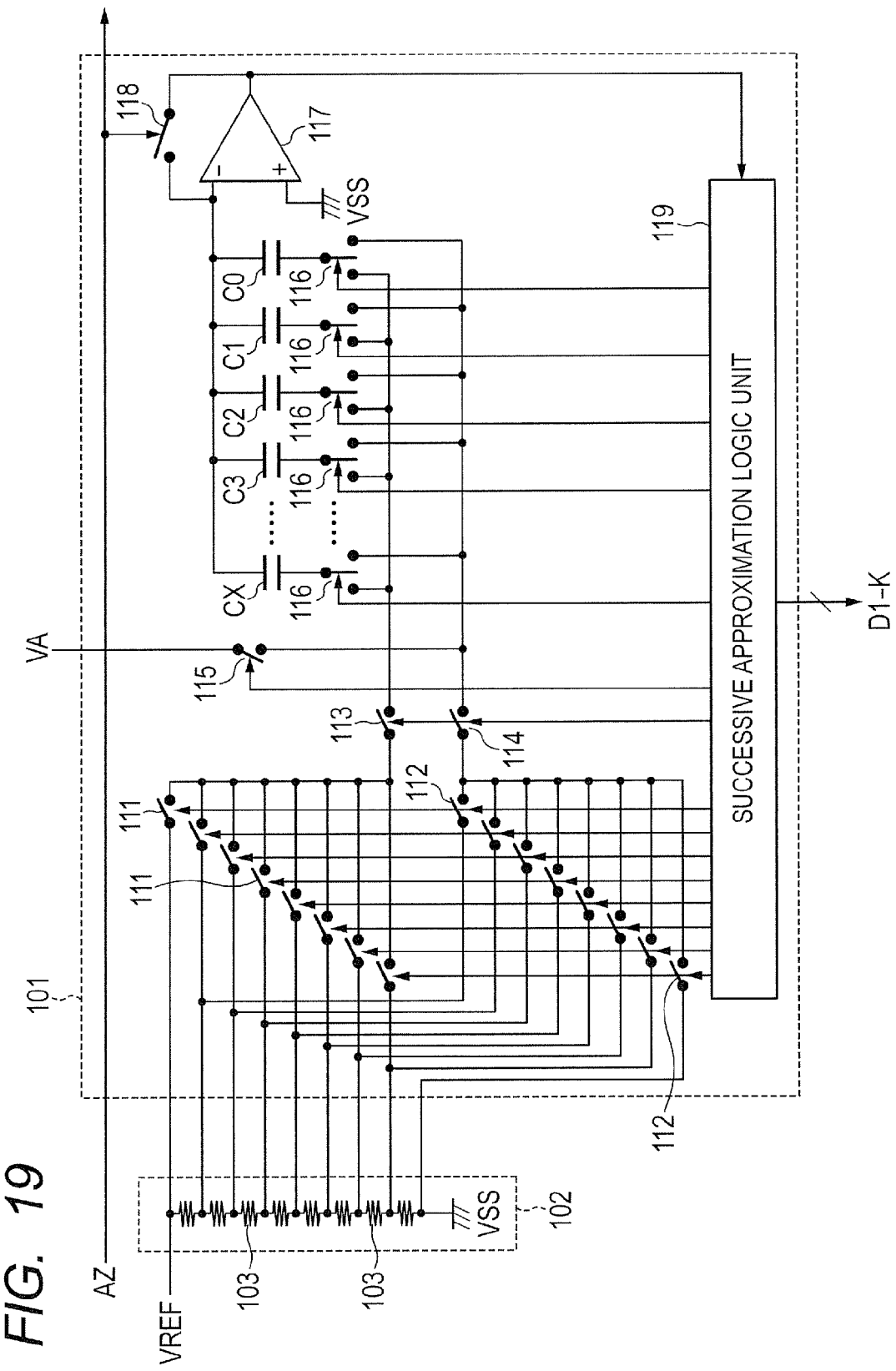
FIG. 19 is a circuit block diagram of the configuration of a reference voltage generation circuit and a main body shown in FIG. 18.

FIG. 19 is a circuit block diagram of the configuration of the reference voltage generation circuit 102 and the main body 101. In FIG. 19, the reference voltage generation circuit 102 includes multiple (here, 8) resistance elements 103 coupled in series between the line of the reference voltage VREF and the line of the ground voltage VSS. The reference voltage generation circuit 102 divides the reference voltage VREF to generate reference voltages VREF, VREX×7/8, . . . , VREF/8, and VSS, and provides the generated reference voltages to the main body 101. If the reference voltage VREF is 1 V, the voltage between the terminals of each resistance element 103 is 1/8=125 mV. Thus, the reference voltages VREF, VREX×7/8, . . . , VREF/8, and VSS are 1 V, 7/8 V, . . . , 1/8 V, and 0 V, respectively.

The main body 101 is a successive approximation type A/D converter, including 8 pairs of switches 111 and 112, one pair of switches 113 and 114, (X+1) switches 116, capacitors C0 to CX, an operational amplifier 117, a switch 118, and a successive approximation logic unit 119. If c is the capacitance of the capacitor C0, the capacitance of the capacitors C1 to CX is respectively c, 2c, 4c, . . . , and $2^{x-1}$. The sum of the capacitance of the capacitors C0 to CX is $2^x c$.

One side terminals of the 8 switches 111 receive the reference voltages VREF, VREX×7/8, . . . , VREF/8, respectively. Then, all the other side terminals of the switches 111 are coupled to one side terminal of the switch 113. The other side terminal of the switch 113 is coupled to one side terminal of each switch 116. One side terminals of the 8 switches 112 are respectively receive the reference voltages VREF, VREX×7/8, . . . , VREF/8, and VSS. Then, all the other side terminals of the switches 112 are coupled to one side terminal of the switch 114. The other side terminal of the switch 114 is coupled to the other side terminal of each switch 116.

One side terminal of the switch 115 receives the output voltage VA of the PGA circuit 11. Then, the other side terminal of the switch 115 is coupled to the other side terminal of each of the switches 116. The common terminal of the (X+1) switches 116 is coupled to the one side electrodes of the capacitors C0 to CX, respectively. Then, all the other side terminals of the capacitors C0 to CX are coupled to the inverting input terminal (negative terminal) of the operational amplifier 117. The non-inverting input terminal (positive terminal) of the operational amplifier 117 receives the ground voltage VSS. The switch 118 is coupled between the non-inverting input terminal and the output terminal of the operational amplifier 117. The switch 118 is made conductive when the activation level of the auto-zero signal AZ is switched to "H" level.

When the switch 118 is conductive, the operational amplifier 117 operates as a unity gain buffer. When the switch 118 is non-conductive, the operational amplifier 117 operates as a comparator. A successive approximation logic unit 119 controls all the switches 111 to 116 based on the output signal of the operational amplifier 117. Then, the successive approximation logic unit 119 outputs the digital signals D1 to DK.

Figure 20:
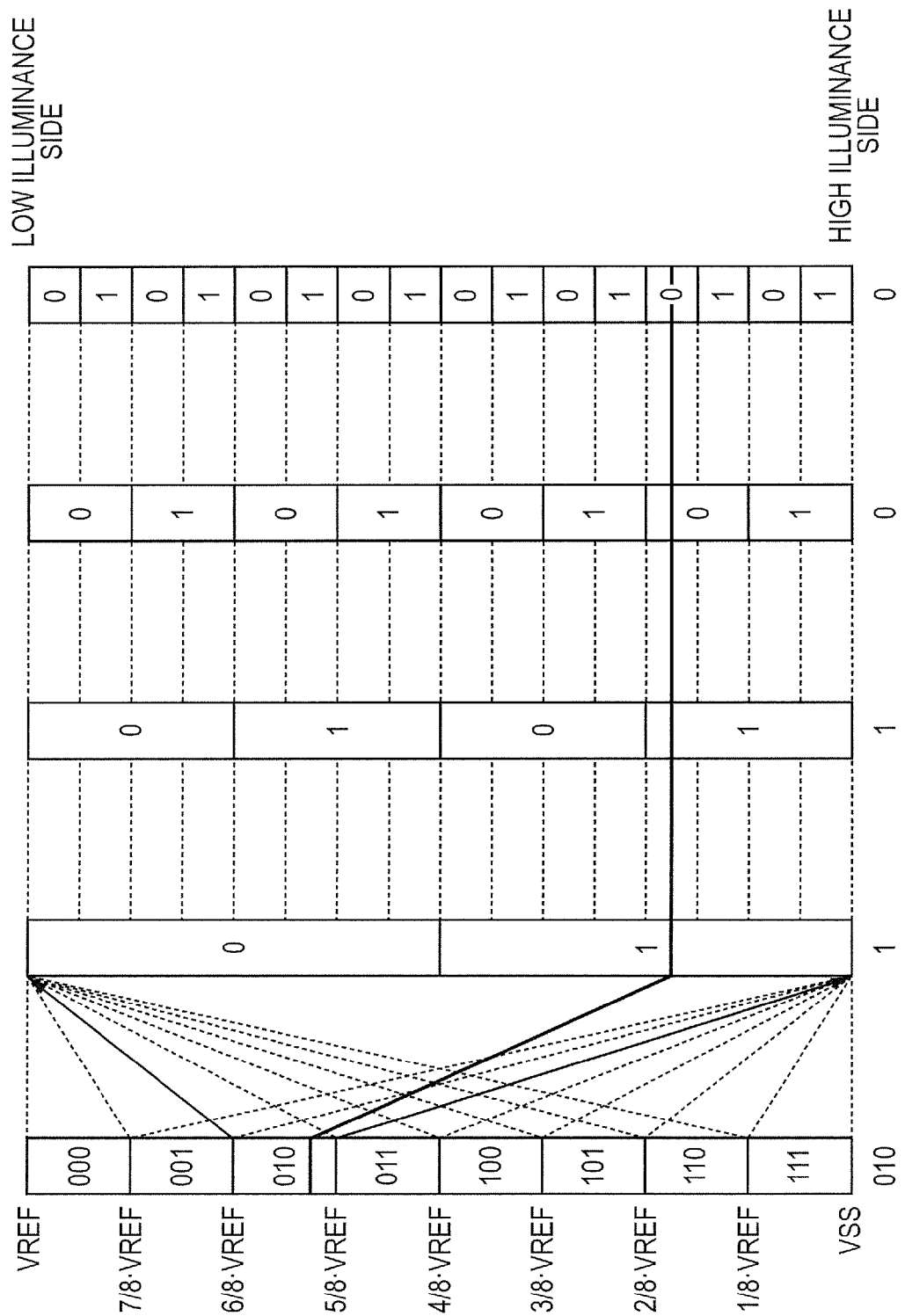
FIG. 20 is a view of the operation of the CMOS image sensor shown in FIGS. 18 and 19.

FIG. 20 is a view of the operation of the main body 101. First, the main body 101 samples the output voltage VA of the PGA circuit 11. In other words, the main body 101 samples the amplified output voltage of the pixel circuit P. More specifically, the switches 113 and 114 are made non-conductive, the switch 115 is made conductive, the other side terminals of all the switches 116 and the common terminal are made conductive with each other, and the switch 118 is made conductive.

When the switch 118 is made conductive, the operational amplifier 117 operates as a unity gain buffer. Then, the voltage appears in the inverting input terminal at a value the sum of the voltage of the non-inverting input terminal and the offset voltage of the operational amplifier 117. Here, to simplify the description, it is assumed that the offset voltage of the operational amplifier 117 is 0 V and the voltage of the non-inverting input terminal is 0 V. However, in the actual circuit, a fixed voltage between the power supply voltage VDD and the ground voltage VSS is applied to the non-inverting input terminal so that the operation amplifier 117 operates as desired. Further, at this time, the output voltage VA of the PGA circuit 11 is applied to one side terminals of the capacitors C0 to CX.

Next, the main body 101 holds the sampled output voltage of the PGA circuit 11 in the capacitors C0 to CX. In other words, in the state in which the switches 113 and 114 are conductive, the switch 115 is made non-conductive, one side terminals of all the switches 116 and the common terminal are made conductive with each other, and the switch 118 is made non-conductive. At this time, the charge accumulated in the capacitors C0 to CX may not be moved, so that the output voltage VA of the PGA circuit 11 is held as the voltage between the terminals of the capacitors C0 to CX.

Next, the main body 101 performs comparison and determination. In the comparison and determination, the main body 101 first performs high-order bit determination by using the output voltage of the reference voltage generation circuit 102. Then, the main body 101 performs low-order bit determination by using the capacitors C0 to CX. In the high-order bit determination, for example, if the high-order bits are three bits, the main body 101 extracts the reference voltages VREF, VREX×7/8, . . . , VREF/8, and VSS sequentially two by two, from the highest to the lowest values, and gives the reference voltages to the capacitors C0 to CX. In other words, the switches 115 and 118 are made non-conductive, and one side terminals of all the switches 116 and the common terminal are made conductive with each other. Then, in this state, the switches 113 and 114 are made conductive.

In this state, the 8 switches 111 are made conductive from the side of the reference voltage VREF to the side of the ground voltage VSS, sequentially, at predetermined time intervals. In this way, the voltage of one side terminals of the capacitors C0 to CX is changed to VREF, VREX×7/8, . . . , VREF/8. Following this change, the voltage of the inverting input terminal is changed to VREF-VA, VREX×7/8-VA, . . . , VREF/8-VA, and VSS-VA. Of the changes at 8 levels, the polarity of the output voltage of the operational amplifier 117 is reversed at the level in which the polarity of the input voltage of the operational amplifier 117 is changed. In FIG. 20, it is shown that the polarity of the output voltage of the operational amplifier 117 is reversed at the level in which the voltage is changed from VREX×6/8 to VREX×5/8, and the high-order three bits are determined to be 010.

In the low-order bit determination, the main body 101 selects the level determined by the high-order bit determination, to perform the determination by using the capacitors C0 to CX. In other words, the upper limit voltage and the lower limit voltage are set to VREX×6/8 and VRFEx5/8, respectively. Then, in the state in which the switches 115 and 118 are non-conductive, the switches 113 and 114 are made conductive, and the third switch 111 of the 8 switches 111 is made conductive to extract the upper limit voltage VREX×6/8. Then, the third switch 112 of the 8 switches 112 is made conductive to extract the lower limit voltage FREFx5/8.

The switching operation of the (X+1) switches 116 is performed by binary search from the MSB side (CX side) to the LSB side (C0 side). More specifically, the switch 116 on the MSB side is switched, and the voltage of one side electrode of the capacitor CX is switched to the lower limit voltage VREX×5/8 from the upper limit voltage VRFEx6/8. Before and after the switching operation, the charge of the capacitor CX is stored, so that the voltage of the inverting input terminal of the operational amplifier 117 changes as shown in the following equation (1).

$$2Xc[V(t)-VT]=2X-1C[V(t+1)-VT]+2X-1c[V(t+1)-(VT-dV)] \quad (1)$$

Here, V(t) is the voltage of the inverting input terminal before the switching of the switch 116, and V(t+1) is the voltage of the inverting input terminal after the switching of the switch 116. Further, VT is the upper limit voltage, which is VRFEx6/8 in this example. In addition, dV is the voltage between the terminals of the resistance element 103 and is VRFE/8.

Getting the equation (1) straight and the following can be obtained;

$$V(t)-VT=[V(t+1)-VT]/2+[V(t+1)-(VT-dV)]/2,$$

and further, $$V(t+1)=V(t)-dV/2$$

Here, V(t)=−VA+VREX×6/8, thus the following can be obtained:

$$V(t+1)=-VA+VREX\times6/8-(VREF/8)/2$$

The voltage V(t+1) of the inverting input terminal is compared to the voltage of the non-inverting input terminal after switching, to determine the value of the fourth high-order bit. In the case of FIG. 20, the value of the fourth high-order bit is determined to be "1", and the switch 116 on the MSB side is set to the state after switching. In this way, the main body 101 performs the same determination also for the low-order bits until LSB.

In the third comparative example, successive approximation A/D conversion is performed. Thus, the third comparative is more advantageous in increasing the operation speed than the first comparative example in which single-slope integration A/D conversion is performed. For example, in the single-slope integration A/D conversion method, if the resolution is K bits, the number of clocks of the counter 15 is 2K in the period of sweeping the effective range of the ramp wave signal VR. On the other hand, in the successive approximation A/D conversion method that is based on the binary search, if the resolution is K bits, the number of times of comparison determination can be K times. Thus, the difference in the time required for comparison determination between the two comparative examples increases as the resolution increases. However, the third comparative example also has a problem that the dynamic range is small.

Fifth Embodiment

Figure 21:
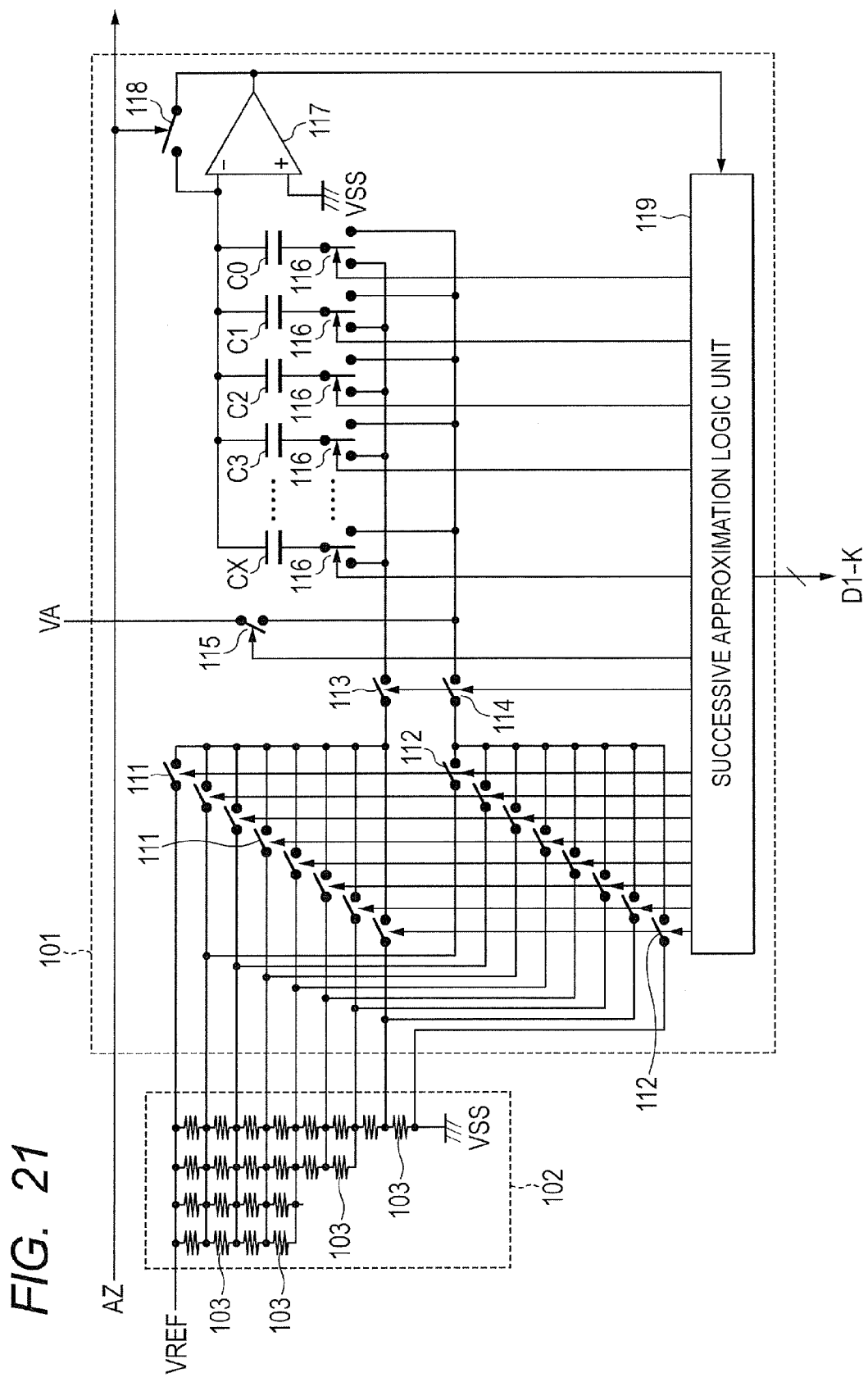
FIG. 21 is a circuit block diagram showing the main part of a CMOS image sensor according to a fifth embodiment of the present invention.

FIG. 21 is a circuit block diagram showing the main part of a CMOS image sensor according to a fifth embodiment of the present invention. FIG. 21 is contrasted with FIG. 19. With reference to FIG. 21, the difference in the CMOS image sensor of the fifth embodiment from the CMOS image sensor of the third comparative example is that the reference voltage generation circuit 102 is replaced by a reference voltage generation circuit 120.

The reference voltage generation circuit 120 includes 22 resistance elements 103. 8 resistance elements 103 are coupled in series between the line of the reference voltage VREF and the line of the ground voltage VSS. Three resistance elements 103 are coupled in parallel to each of the first to fourth resistance elements 103 as seen from the line of the reference voltage VREF. Then, one resistance element 103 is coupled in parallel to each of the fifth to sixth resistance elements 103.

If the resistance value of the parallel coupled 4 resistance elements 103 is 1, the resistance value of the parallel coupled 2 resistance elements 103 is 2, and the resistance value of the resistance element 103 is 4. If the reference voltage VREF is 1 V, the voltage drop of the parallel coupled 4 resistance elements 103 is 62.5 mV, the voltage drop of the parallel coupled 2 resistance elements 103 is 125 mV, and the voltage drop of one resistance element 103 is 250 mV.

Thus, the reference voltage generation circuit 120 generates VREF, VREX×15/16, VREX×14/16, VREX×13/16, VREX×12/16, VREX×10/16, VREX×8/16, VREX×4/16, and VSS. The reference voltage on the VREF side is assigned to the low illuminance side, and the reference voltage on the VSS side is assigned to the high illuminance side. In this way, the resolution on the low illuminance side can be set to high resolution, and the resolution on the high illuminance side can be set to low resolution. As a result, it is possible to obtain a dynamic range greater than that of the third comparative example.

Figure 22:
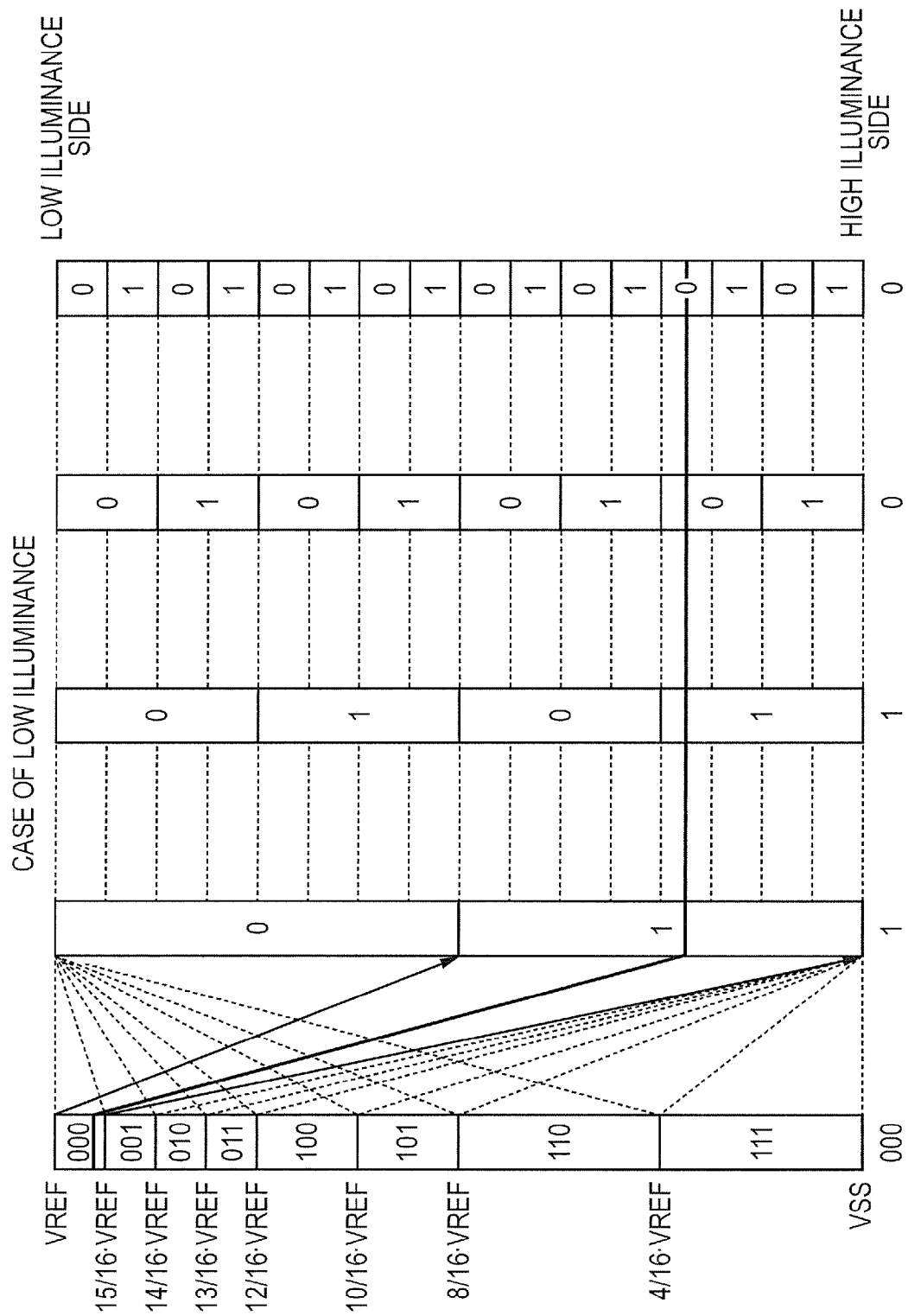
FIG. 22 is a view of the operation of the CMOS image sensor shown in FIG. 21.

FIG. 22 is a view of the operation of the CMOS image sensor described above. FIG. 22 is contrasted with FIG. 20. FIG. 22 shows the case in which the installation location of the CMOS image sensor is low illuminance. In the case of low illuminance, this CMOS image sensor can obtain a higher resolution than that of the third comparative example.

Figure 23:
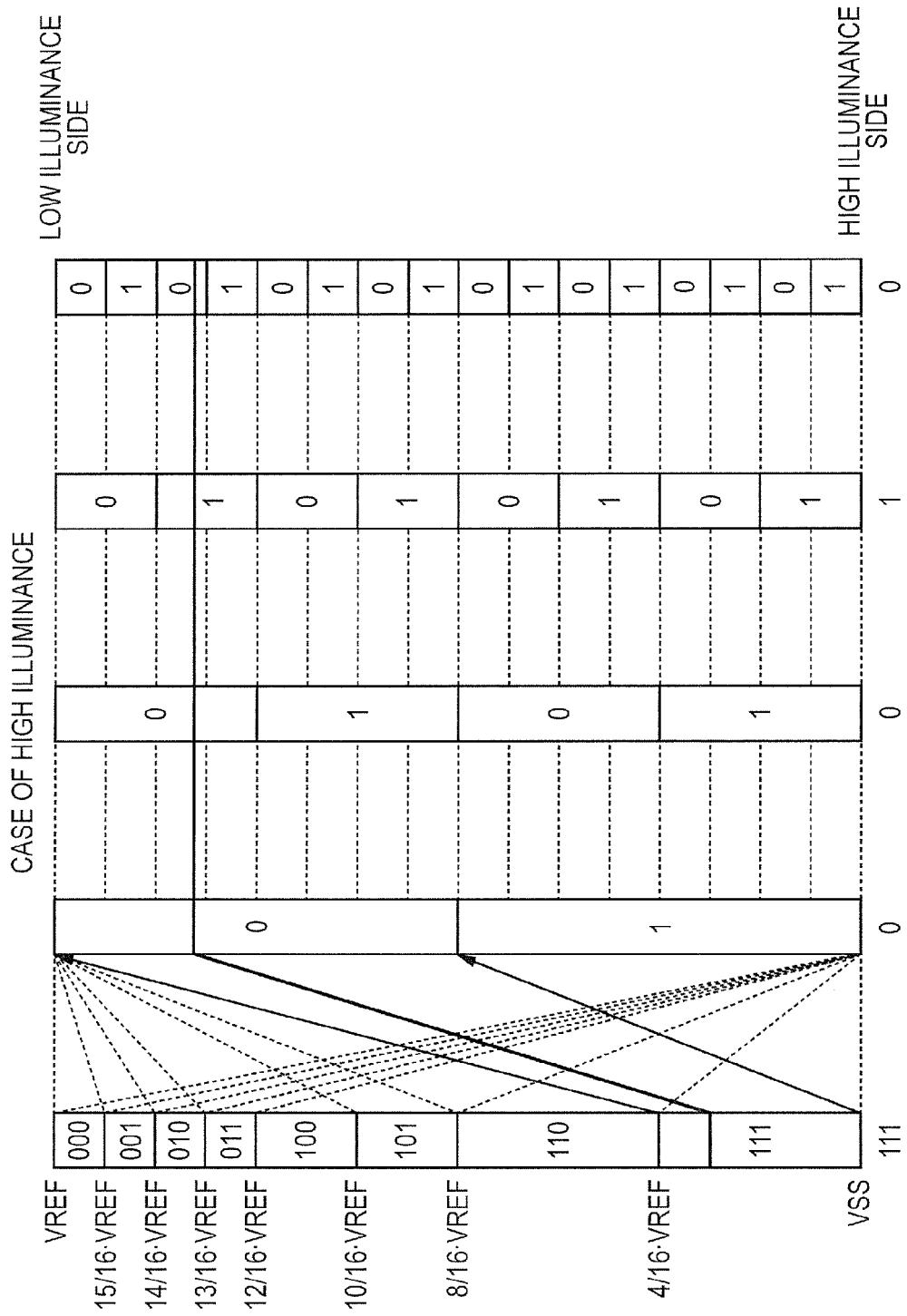
FIG. 23 is another view of the operation of the CMOS image sensor shown in FIG. 21.

FIG. 23 is another view of the operation of the CMOS image sensor. FIG. 23 is contrasted with FIG. 20. FIG. 23 shows the case in which the installation location of the CMOS image sensor is high illuminance. In this CMOS image sensor, the resolution in the case of high illuminance is lower than that of the third comparative example.

Figure 8:
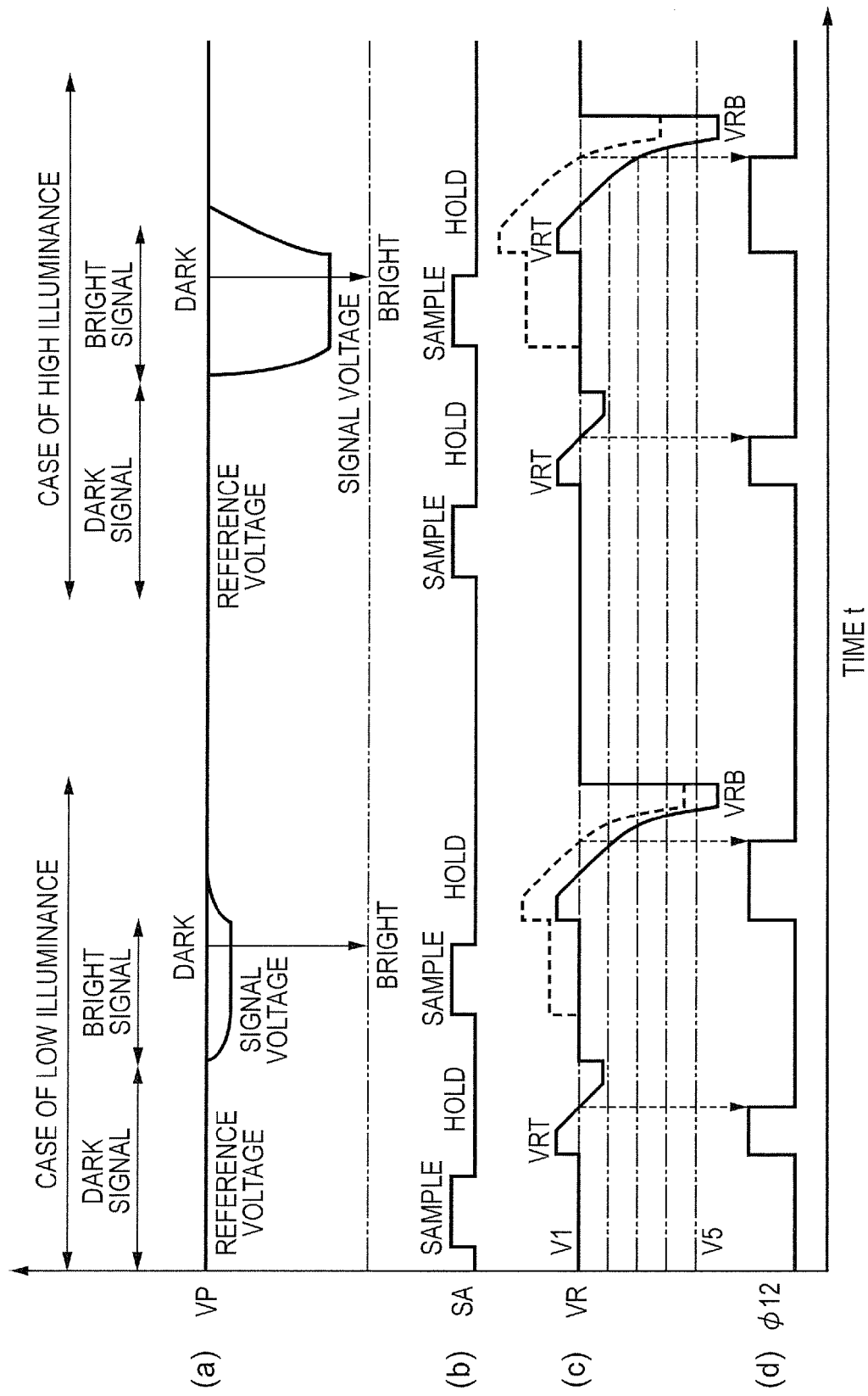
FIGS. 8A to 8D are time charts showing the operation of the CMOS image sensor described with reference to FIG. 7.

In the fifth embodiment, as described in the first embodiment with reference to FIGS. 7 and 8, two time exposures of high illuminance exposure (short exposure) and low illuminance exposure (long exposure) are performed, and the output codes for the two time exposures are combined together in order to obtain a greater dynamic range.

Sixth Embodiment

Figure 24:
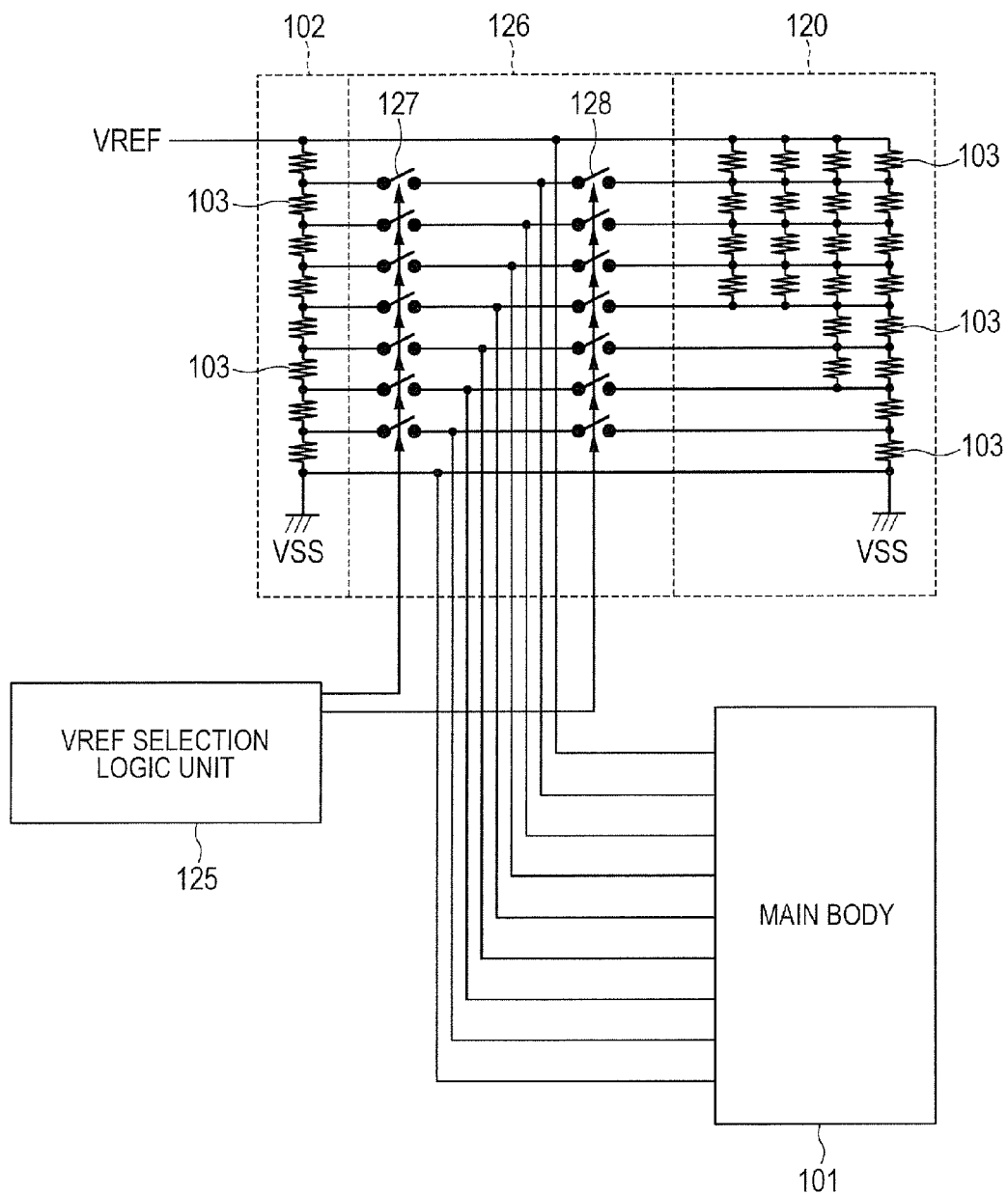
FIG. 24 is a circuit block diagram of the configuration of a reference voltage generation circuit included in a CMOS image sensor according to a sixth embodiment of the present invention.

FIG. 24 is a circuit block diagram showing the main part of a CMOS image sensor according to a sixth embodiment of the present invention. FIG. 24 is contrasted with FIG. 21. With reference to FIG. 24, the difference in the CMOS image sensor of the sixth embodiment from the CMOS image sensor of the fifth embodiment is that the reference voltage generation circuit 102, a VREF selection logic unit 125, and a switching circuit 126 are added.

The VREF selection logic unit 125 selects either one of the reference voltage generation circuits 102 and 120, according to an external signal and the like. This is because it is desired to use the reference voltage generation circuit 102 of the third comparative example, depending on the type of the object.

The switching circuit 126 includes 7 sets of switches 127 and 128. When the reference voltage generation circuit 102 is selected, all the switches 127 are made conductive while all the switches 128 are made non-conductive. Then, the reference voltages VREF, VREX×7/8, . . . , VREF/8, and VSS, which are generated in the reference voltage generation circuit 102, are given to the main body 101.

On the other hand, when the reference voltage generation circuit 120 is selected, all the switches 127 are made non-conductive while all the switches 128 are made conductive. Then, the reference voltages VREF, VREX×15/16, . . . , VREX×4/16, and VSS, which are generated in the reference voltage generation circuit 120, are given to the main body 101.

In the sixth embodiment, it is possible to change the size of the dynamic range according to the type of the object and the like.

Although the invention made by the present inventors has been specifically described based on the embodiments of the present invention, the present invention is not limited to the specific embodiments, and various changes and modifications can be made without departing from the scope of the present invention.

What is claimed is:

1. A solid-state image sensing device comprising:
    a pixel circuit for outputting a voltage of a level corresponding to the illuminance; and
    an A/D converter for converting an output voltage of the pixel circuit into a digital signal,
    wherein the resolution on a low illuminance side is higher than the resolution on a high illuminance side in the A/D converter,
    wherein the solid-state image sensing device further comprises:
        a ramp wave generation circuit for generating a ramp wave signal that varies in a range from a voltage corresponding to a minimum illuminance to a voltage corresponding to a maximum illuminance; and
        a reference voltage generation circuit for generating reference voltages of the ramp wave signal corresponding to illuminances of a plurality of levels from the minimum illuminance to the maximum illuminance, respectively,
    wherein the A/D converter includes:
        a comparator for comparing the voltage level between the output voltage of the pixel circuit and the voltage of the ramp wave signal; and
        a signal generation circuit for generating the digital signal based on a time from when the comparison is started by the comparator to when a comparison result of the comparator changes,
    wherein in the interval of the reference voltage on the low illuminance side is smaller than the interval of the reference voltage on the high illuminance side, and
    wherein the reference voltage generation circuit operates at a same clock frequency both on the low illuminance side and on the high illuminance side, therefore, a rate of change of the voltage per a predetermined time of the ramp wave signal on the low illuminance side is smaller than a rate of change of the voltage per the predetermined time of the ramp wave signal on the high illuminance side.

2. The solid-state image sensing device according to claim 1,
    wherein the reference voltage generation circuit has a plurality of resistance elements that are coupled in series between a first voltage line and a second voltage line,
    wherein the reference voltage generation circuit includes a voltage divider for dividing the voltage between the first voltage and the second voltage, to generate the reference voltages of the levels.

3. The solid-state image sensing device according to claim 2,
    wherein the solid-state image sensing device further comprises a control part for exposing the pixel circuit a plurality of times by changing the exposure time in one frame period, converting a plurality of output voltages of the pixel circuit into a plurality of digital signals by the A/D converter, and combining the digital signals together.

4. The solid-state image sensing device according to claim 2, wherein the resistance values of the resistance elements are equal to each other, wherein the voltage divider includes a plurality of output terminals that are dispersedly disposed between the resistance elements, wherein the resistance value between the output terminals on the low illuminance side is smaller than the resistance value between the output terminals on the high illuminance side.

5. The solid-state image sensing device according to claim 2, wherein each of the resistance elements includes one or more auxiliary resistance elements coupled in parallel, wherein the number of auxiliary resistance elements included in the resistance element on the low illuminance side is greater than the number of auxiliary resistance elements included in the resistance element on the high illuminance side.

6. The solid-state image sensing device according to claim 5, wherein a resistance element of the resistance elements, which includes two or more auxiliary resistance elements, includes a switching circuit for changing the number of auxiliary resistance elements coupled in parallel.

7. The solid-stage image sensing device according to claim 1, wherein the ramp wave generation circuit comprises:

a counter including a plurality of frequency dividers coupled in series, for counting the number of pulses of a clock signal;

a match detection circuit for increasing the rate of increase of the count value of the counter, in response to the matching of the count value of the counter with a predetermined value, wherein the respective reference voltages of the levels being assigned with the count value of the counter in advance; and a switching circuit for selecting any of the reference voltages of the levels based on the counter value of the counter, and outputting the selected reference voltage.

8. The solid-state image sensing device according to claim 1, wherein the solid-state image sensing device further comprises a control part for exposing the pixel circuit a plurality of times by changing the exposure time in one frame period, converting a plurality of output voltages of the pixel circuit into a plurality of digital signals by the A/D converter, and combining the digital signals together.

* * * * *